(12) United States Patent
Choi et al.

(10) Patent No.: US 12,254,231 B2
(45) Date of Patent: Mar. 18, 2025

(54) PROPERLY DISPLAYING IMAGE DEPENDING ON DISPLAY ROTATION STATE OF DISPLAY

(71) Applicant: LG ELECTRONICS INC., Seoul (KR)

(72) Inventors: Woojin Choi, Seoul (KR); Subin Kang, Seoul (KR); Taejin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/470,013

(22) Filed: Sep. 19, 2023

(65) Prior Publication Data

US 2025/0021284 A1  Jan. 16, 2025

(30) Foreign Application Priority Data

Jul. 11, 2023 (KR) .................. 10-2023-0090010

(51) Int. Cl.
*G06F 3/14* (2006.01)
*G06F 1/16* (2006.01)
*G09G 3/00* (2006.01)

(52) U.S. Cl.
CPC .............. *G06F 3/14* (2013.01); *G06F 1/1652* (2013.01); *G09G 3/035* (2020.08); *G09G 2340/0442* (2013.01)

(58) Field of Classification Search
CPC ....... G09G 2340/04; G09G 2340/0407; G09G 2340/0414; G09G 2340/0421; G09G 2340/0442; G09G 2340/0457; G09G 2340/0471; G09G 2340/0478; G09G 2340/0485; G09G 2340/0492

USPC .................................................. 345/156–158
See application file for complete search history.

(56) References Cited

U.S. PATENT DOCUMENTS

| | | | | |
|---|---|---|---|---|
| 2002/0186229 A1* | 12/2002 | Brown Elliott | .......... | G09G 5/02 345/649 |
| 2008/0158260 A1* | 7/2008 | Li | .......... | G09G 3/2092 345/658 |
| 2011/0169728 A1* | 7/2011 | Huang | .......... | G09G 5/003 345/698 |
| 2013/0302007 A1* | 11/2013 | Lee | .......... | H04N 9/79 386/227 |

(Continued)

OTHER PUBLICATIONS

German Patent and Trademark Office, German Patent Application No. 102023127224.1, Office Action dated Jan. 3, 2024, 6 pages.

*Primary Examiner* — Ke Xiao
*Assistant Examiner* — Nelson Lam
(74) *Attorney, Agent, or Firm* — LEE, HONG, DEGERMAN, KANG & WAIMEY

(57) ABSTRACT

Disclosed herein is a display apparatus configured to rotate around a fixed axis. The display apparatus includes: a display configured to rotate around the fixed axis and display an image; and a controller configured to process an original image and control the display to display the original image, wherein the original image is stored in a memory or received through wired or wireless communication. The controller is configured to: obtain an output image by processing a central area including an object in the original image to be suitable for a rotation state of the display and a resolution of the display; and control the display to display the obtained output image.

19 Claims, 16 Drawing Sheets

(56) References Cited

U.S. PATENT DOCUMENTS

| | | | |
|---|---|---|---|
| 2014/0055348 A1* | 2/2014 | Sudo | G06T 3/00 |
| | | | 345/156 |
| 2014/0176612 A1 | 6/2014 | Tamura et al. | |
| 2014/0307001 A1* | 10/2014 | Aizawa | G09G 3/20 |
| | | | 345/659 |
| 2018/0018946 A1 | 1/2018 | Park et al. | |
| 2018/0146224 A1* | 5/2018 | Park | H04N 21/8133 |
| 2020/0026419 A1* | 1/2020 | Jang | G06F 3/013 |
| 2023/0162321 A1* | 5/2023 | Seo | G06T 3/40 |
| | | | 345/428 |

* cited by examiner

FIG. 6
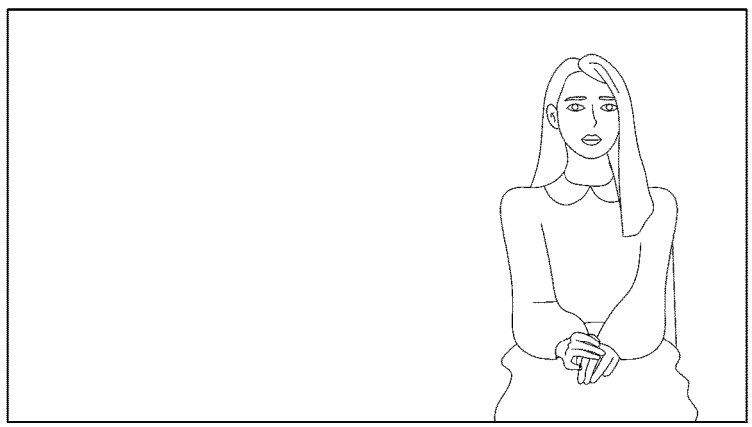
(a)
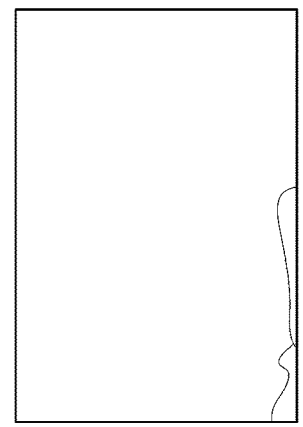
(b)
FIG. 7
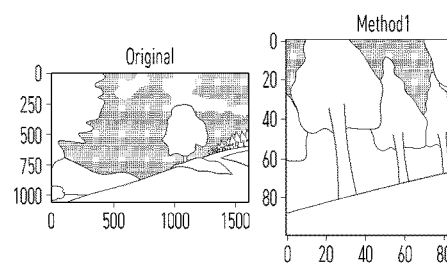
(a)
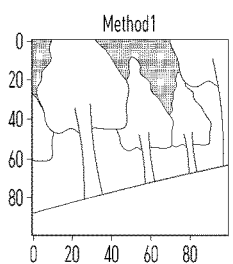
(b)
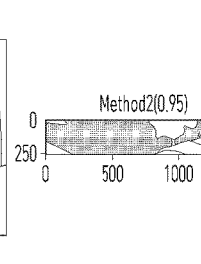
(c)
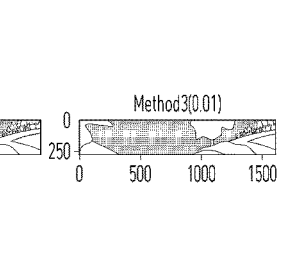
(d)
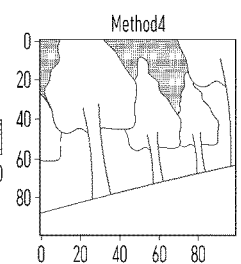
(e)

FIG. 12
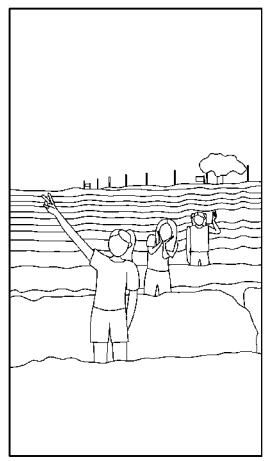
(a)
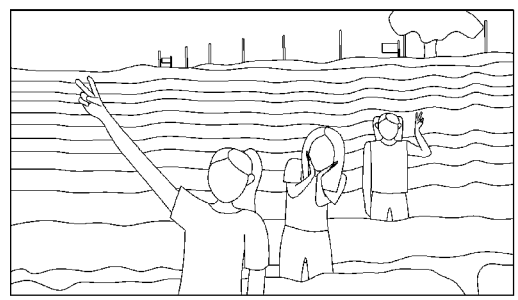
(b)
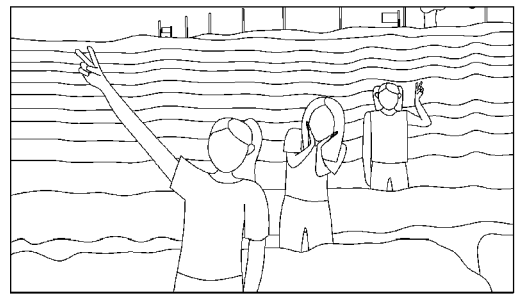
(c)

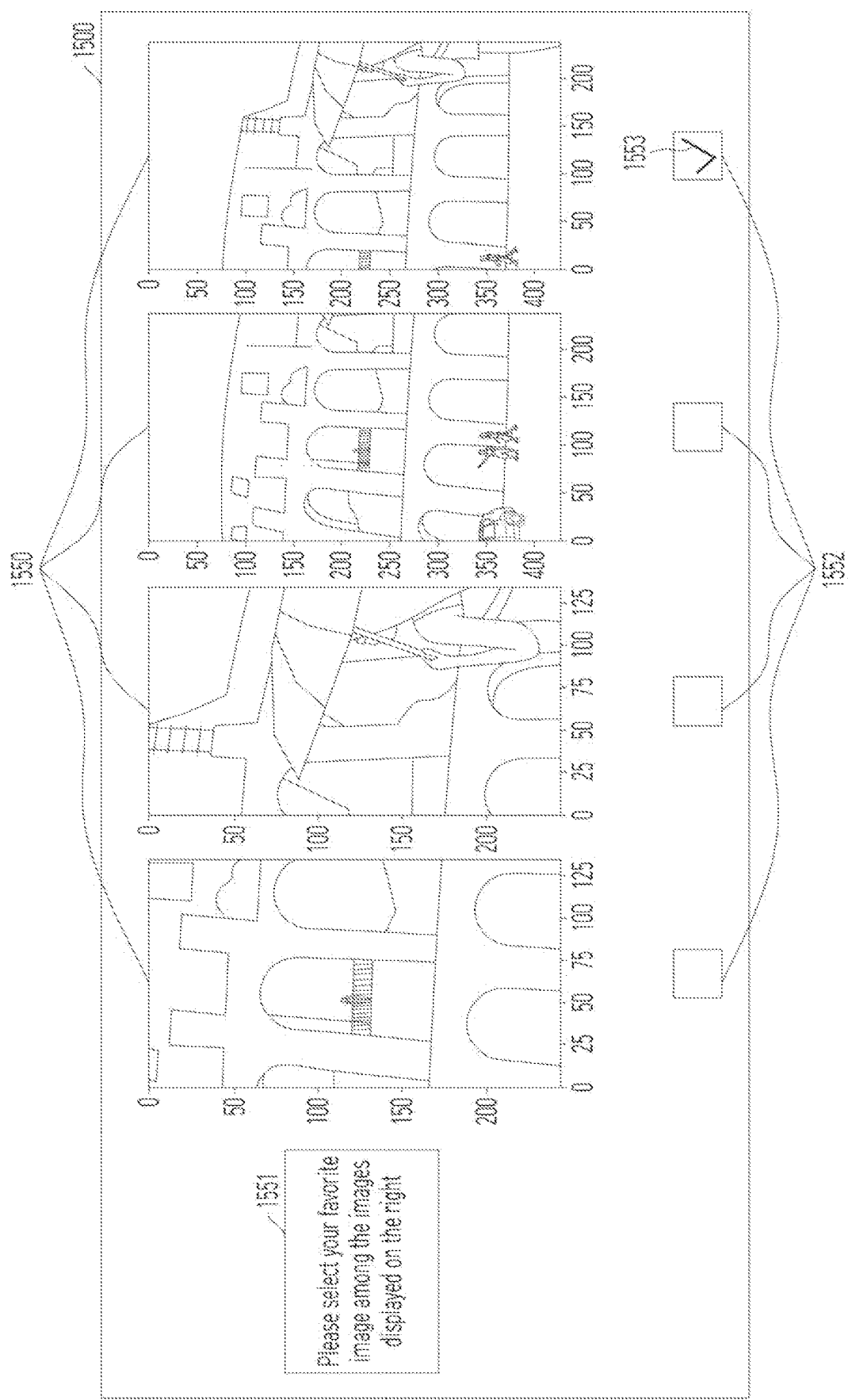

PROPERLY DISPLAYING IMAGE DEPENDING ON DISPLAY ROTATION STATE OF DISPLAY

CROSS-REFERENCE TO RELATED APPLICATION(S)

Pursuant to 35 U.S.C. § 119 (a), this application claims the benefit of earlier filing date and right of priority to Korean Patent Application No. 10-2023-0090010, filed on Jul. 11, 2023, the contents of which are all hereby incorporated by reference herein in their entireties.

BACKGROUND

Technical Field

The present disclosure relates to a display apparatus and image processing or displaying method therefor.

Discussion of the Related Art

Recently, in multimedia devices such as a mobile phone and a TV, a new form-factor is being discussed. The form-factor refers to a structured form of a product.

The reason why form-factor innovation is emerging as important in a display industry is because of increasing needs of a user for the form-factor that may be used freely and conveniently regardless of a use situation departing from a typical form-factor customized for a specific use environment in the past, resulted from an increase in consumer mobility, convergence between devices, a rapid progress in smartization, and the like.

For example, vertical TVs are expanding, breaking the stereotype that the TVs are viewed horizontally. The vertical TV is a product that allows the user to change a direction of a screen by reflecting characteristics of the Millennials and Gen Z who are accustomed to enjoying content on mobile. The vertical TVs are convenient because a social media or a shopping site image may be viewed easily and comments may be read while watching videos at the same time. In particular, the advantages of the vertical TV are magnified more when the vertical TV is in association with a smartphone via a near-field communication (NFC)-based mirroring function. When watching regular TV programs or movies, the TV may be switched horizontally.

As another example, a rollable TV and a foldable smartphone are similar to each other in that they both use 'flexible displays'. The flexible display literally means a flexible electronic device. To be flexible, the flexible display must first be thin. A substrate that receives information and converts the same into light must be thin and flexible so that a performance lasts for a long time without damage.

Being flexible means that the flexible display should not be greatly affected even when an impact is applied thereto. While the flexible display is bent or folded, a pressure is continuously applied to a junction. It is necessary to have excellent durability such that the inside is not damaged by such pressure, but also have a property of being easily deformed when the pressure is applied.

The flexible display is implemented based on an OLED, for example. The OLED is a display using an organic light emitting material. The organic material is relatively more flexible than an inorganic material such as a metal. Furthermore, the OLED has a thin substrate and thus is more competitive than other displays. In a case of an LCD substrate used in the past, there is a limit to reducing a thickness because liquid crystal and glass are required separately.

Finally, as a new form-factor for the TV, a demand for a TV that may be easily moved indoors and outdoors is increasing. In particular, because of the recent corona virus epidemic, the time the users stay at home is increasing, and thus, a demand for a second TV is increasing. In addition, because of an increase in population going out for camping or the like, there is a demand for the TV of the new form-factor that may be easily carried and moved.

Such TVs with new form factors may allow display rotation as shown in FIGS. 3 to 5 and may be used for various purposes such as listening to music. Thus, there is a need for control methods capable of better satisfying user experience.

The above issues or backgrounds are not limited to TVs only, but the issues or backgrounds may be applied to most devices that are designed to output video or audio.

Accordingly, the following descriptions are applied not only to TVs but also to all devices that output video or audio, and the term "display device" is used instead of the term "TV".

SUMMARY

Accordingly, the present disclosure is directed to a display apparatus and image processing method therefor that substantially obviates one or more problems due to limitations and disadvantages of the related art.

To provide a solution to the aforementioned issues, the present disclosure proposes a method of processing an image to properly display the image on a display depending on the rotation state or direction of the display.

In addition, the present disclosure proposes a method of allowing a user to select one of a plurality of displayed images to improve user experience satisfaction and storing information on the selected image to use the information during image processing for the user.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, there is provided a display apparatus configured to rotate around a fixed axis. The display apparatus includes: a display configured to rotate around the fixed axis and display an image; and a controller configured to process an original image and control the display to display the original image, wherein the original image is stored in a memory or received through wired or wireless communication. The controller is configured to: obtain an output image by processing a central area including an object in the original image to be suitable for a rotation state of the display and a resolution of the display; and control the display to display the obtained output image.

In another aspect of the present disclosure, there is provided a method of processing and displaying an image. The method is performed by a rotatable display apparatus including: a display configured to rotate around a fixed axis and display an image; and a controller configured to process an original image and control the display to display the original image, wherein the original image is stored in a memory or received through wired or wireless communication. The method includes: obtaining the original image: obtaining an output image by processing a central area including an object in the original image to be suitable for a rotation state of the display and a resolution of the display; and controlling the display to display the obtained output image.

It will be understood by those skilled in the art that the above-described aspects of the present disclosure are merely part of various embodiments of the present disclosure, and various modifications and alternatives could be developed from the following technical features of the present disclosure.

The present disclosure has the following effects.

According to the present disclosure, an image may be processed to be suitable for the rotation state of a display, and the processed image may be displayed on the display.

In addition, user's feedback may be incorporated into image processing.

The effects that are achievable by the present disclosure are not limited to what has been particularly described hereinabove and other advantages not described herein will be more clearly understood by persons skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a view for explaining an image in which conventional problems may occur:

FIG. 7 illustrates an original image and partial images extracted therefrom according to various methods:

FIG. 12 illustrates a cropping procedure for obtaining an output image:

FIG. 21 illustrates an exemplary user interface for displaying the processes described in FIG. 17 on a display.

DETAILED DESCRIPTION

Figure 1:
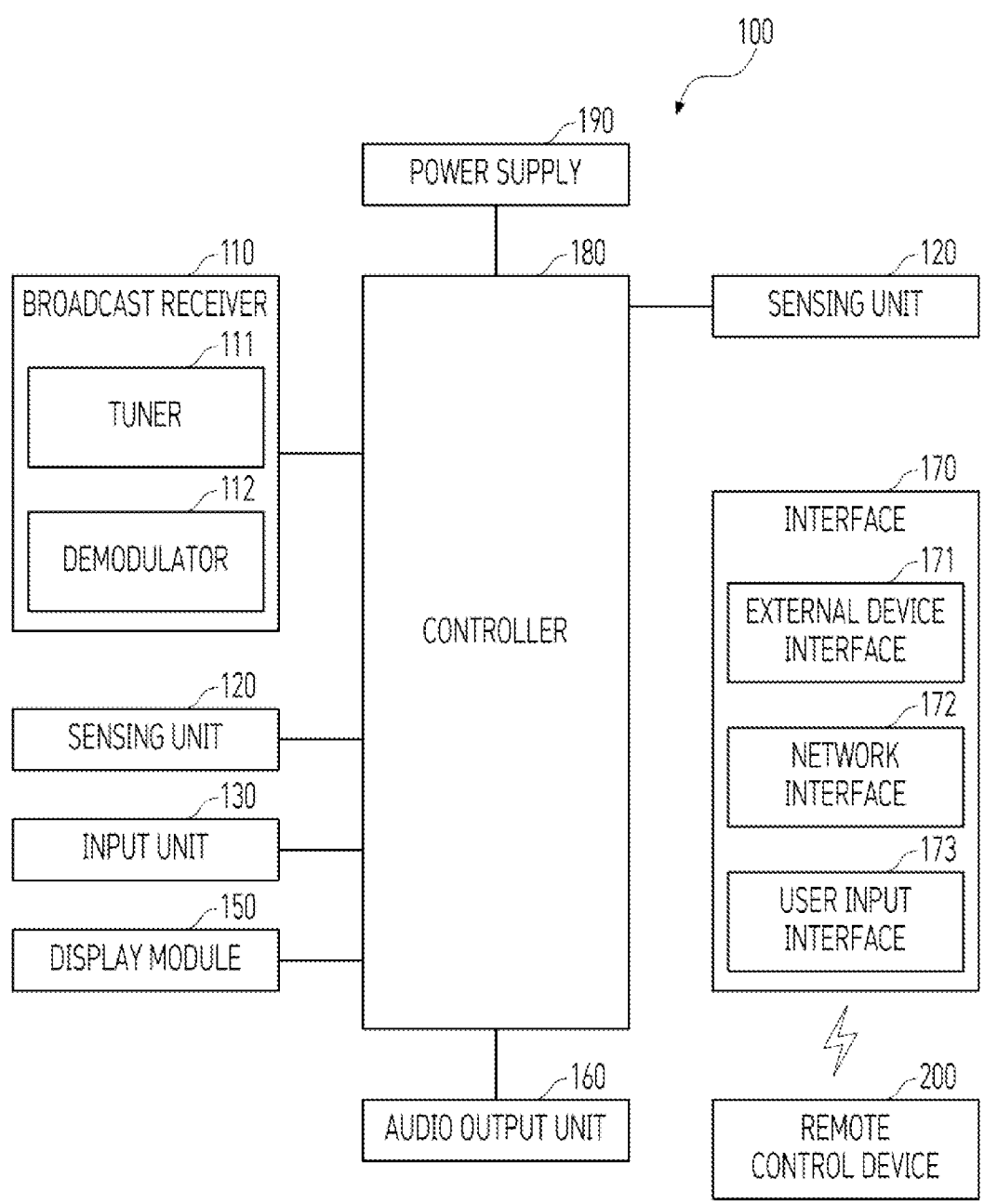
FIG. 1 is a block diagram for explaining each component of a display device.

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

In the following descriptions, the term "display device" will be used. However, the term "display device" may refer to various devices such as TVs, multimedia devices, and so on, and thus, the scope of the present disclosure is not limited to specific terminology.

FIG. 1 is a block diagram for illustrating each component of a display device 100 according to an embodiment of the present disclosure.

The display device 100 may include a broadcast receiver 1210, an external device interface 171, a network interface 172, storage 140, a user input interface 173, an input unit 130, and a controller 180, a display module 150, an audio output unit 160, and/or a power supply 190.

The broadcast receiver 1210 may include a tuner 1211 and a demodulator 1212.

Unlike the drawing, the display device 100 may include only the external device interface 171 and the network interface 172 among the broadcast receiver 1210, the external device interface 171, and the network interface 172. That is, the display device 100 may not include the broadcast receiver 1210.

The tuner 1211 may select a broadcast signal corresponding to a channel selected by the user or all pre-stored channels among broadcast signals received via an antenna (not shown) or a cable (not shown). The tuner 1211 may convert the selected broadcast signal into an intermediate-frequency signal or a base band image or audio signal.

For example, when the selected broadcast signal is a digital broadcast signal, the tuner 1211 may convert the digital broadcast signal into a digital IF signal (DIF), and when the selected broadcast signal is an analog broadcast signal, the tuner 1211 may convert the analog broadcast signal into an analog base band image or audio signal (CVBS/SIF). That is, the tuner 1211 may process the digital broadcast signal or the analog broadcast signal. The analog base band image or audio signal (CVBS/SIF) output from the tuner 1211 may be directly input to the controller 180).

In one example, the tuner 1211 may sequentially select broadcast signals of all stored broadcast channels via a channel memory function among the received broadcast signals, and convert the selected signals into the intermediate-frequency signal or the base band image or audio signal.

In one example, the tuner 1211 may include a plurality of tuners to receive broadcast signals of a plurality of channels. Alternatively, the tuner 1211 may be a single tuner that simultaneously receives the broadcast signals of the plurality of channels.

The demodulator 1212 may receive the digital IF signal (DIF) converted by the tuner 1211 and perform a demodulation operation. The demodulator 1212 may output a stream signal (TS) after performing demodulation and channel decoding. In this regard, the stream signal may be a signal in which an image signal, an audio signal, or a data signal is multiplexed.

The stream signal output from the demodulator 1212 may be input to the controller 180. The controller 180 may output an image via the display module 150 and output an audio via the audio output unit 160 after performing demultiplexing, image/audio signal processing, and the like.

A sensing unit 120 refers to a device that senses a change in the display device 100 or an external change. For example, the sensing unit 120 may include at least one of a proximity sensor, an illumination sensor, a touch sensor, an infrared (IR) sensor, an ultrasonic sensor, an optical sensor (e.g., a camera), a voice sensor (e.g., a microphone), a battery gauge, and an environment sensor (e.g., a hygrometer, a thermometer, and the like).

The controller 180 may check a state of the display device 100 based on information collected by the sensing unit 120, and when a problem occurs, the controller 180 may notify the user of the problem or may make adjustments on its own to control the display device 100 to maintain the best state.

In addition, a content, an image quality, a size, and the like of the image provided by the display module 150 may be controlled differently based on a viewer sensed by the sensing unit, a surrounding illumination, or the like to provide an optimal viewing environment. As a smart TV progresses, the number of functions of the display device increases and the number of sensing units 20 also increases together.

The input unit 130 may be disposed at one side of a main body of the display device 100. For example, the input unit 130 may include a touch pad, a physical button, and the like. The input unit 130 may receive various user commands related to an operation of the display device 100 and transmit a control signal corresponding to the input command to the controller 180).

Recently, as a size of a bezel of the display device 100 decreases, the number of display devices 100 in a form in which the input unit 130 in a form of a physical button exposed to the outside is minimized is increasing. Instead, the minimized physical button may be located on a rear surface or a side surface of the display device 100, and a user input may be received from a remote control device 200 via the touch pad or the user input interface 173 to be described later.

The storage 140 may store programs for processing and controlling each signal in the controller 180, or may store signal-processed image, audio, or data signals. For example, the storage 140 may store application programs designed for the purpose of performing various tasks processable by the controller 180, and may selectively provide some of the stored application programs upon request from the controller 180.

The programs stored in the storage 140 are not particularly limited as long as they may be executed by the controller 180. The storage 140 may also perform a function for temporarily storing the image, audio, or data signals received from an external device via the external device interface 171. The storage 140 may store information on a predetermined broadcast channel via the channel memory function such as a channel map.

FIG. 1 shows an embodiment in which the storage 140 is disposed separately from the controller 180, but the scope of the present disclosure is not limited thereto, and the storage 140 is able to be included in the controller 180.

The storage 140 may include at least one of a volatile memory (e.g., a DRAM, a SRAM, a SDRAM, and the like) or a non-volatile memory (e.g., a flash memory, a hard disk drive (HDD), a solid-state drive (SSD), and the like).

The display module 150 may generate a driving signal by converting the image signal, the data signal, an OSD signal, and a control signal processed by the controller 180 or the image signal, the data signal, a control signal, and the like received from the interface 171. The display module 150 may include the display panel 11 having the plurality of pixels.

The plurality of pixels disposed on the display panel may include RGB sub-pixels. Alternatively, the plurality of pixels disposed on the display panel may include RGBW sub-pixels. The display module 150 may generate driving signals for the plurality of pixels by converting the image signal, the data signal, the OSD signal, the control signal, and the like processed by the controller 180.

The display module 150 may be a plasma display panel (PDP), a liquid crystal display (LCD), an organic light emitting diode (OLED), a flexible display module, and the like, or may be a three-dimensional (3D) display module. The 3D display module 150 may be classified into a non-glasses type and a glasses type.

The display device 100 includes the display module that occupies most of the front surface thereof and a casing that covers a rear surface, a side surface, and the like of the display module and packages the display module.

Recently, the display device 100 may use the display module 150 that may be bent such as the light emitting diode (LED) or the organic light emitting diode (OLED) to realize a curved screen in addition to a flat screen.

The LCD, which was mainly used in the past, received light via a backlight unit because it was difficult for the LCD to emit light on its own. The backlight unit is a device that uniformly supplies light supplied from a light source to a liquid crystal located in the front. As the backlight unit became thinner, it was possible to realize a thin LCD, but it was difficult to implement the backlight unit with a flexible material, and when the backlight unit is bent, it was difficult to uniformly supply the light to the liquid crystal, resulting in a change in brightness of the screen.

On the other hand, the LED or the OLED may be implemented to be bendable because each element constituting the pixel emits light on its own and thus the backlight unit is not used. In addition, because each element emits light on its own, even when a positional relationship with a neighboring element changes, brightness thereof is not affected, so that the display module 150 that is bendable using the LED or the OLED may be implemented.

The organic light emitting diode (OLED) panel appeared in earnest in mid-2010 and is rapidly replacing the LCD in a small and medium-sized display market. The OLED is a display made using a self-luminous phenomenon of emitting light when current flows through a fluorescent organic compound. The OLED has a higher image quality response speed than the LCD, so that there is almost no afterimage when realizing a moving image.

The OLED is a light-emitting display product that uses three types (red, green, and blue) of phosphor organic compounds having a self-luminous function, and uses a phenomenon in which electrons and positively charged particles injected from a cathode and an anode are combined with each other within an organic material to emit light by itself, so that there is no need for a backlight (a backlight device) that deteriorates color.

The light emitting diode (LED) panel, as a technology that uses one LED element as one pixel, may reduce a size of the LED element compared to the prior art, and thus, may implement the display module 150 that is bendable. A device referred to as an LED TV in the past only used the LED as the light source for the backlight unit that supplies the light to the LCD, and the LED itself was not able to constitute the screen.

The display module includes the display panel, and a coupling magnet, a first power supply, and a first signal module positioned on a rear surface of the display panel. The display panel may include a plurality of pixels R. G. and B. The plurality of pixels R, G, and B may be formed in respective areas where multiple data lines and multiple gate lines intersect each other. The plurality of pixels R. G, and B may be disposed or arranged in a matrix form.

For example, the plurality of pixels R. G. and B may include a red (hereinafter, 'R') sub-pixel, a green ('G') sub-pixel, and a blue ('B') sub-pixel. The plurality of pixels R. G. and B may further include a white (hereinafter, 'W') sub-pixel.

In the display module 150, a side on which the image is displayed may be referred to as a front side or a front surface. When the display module 150 displays the image, a side on which the image is not able to be observed may be referred to as a rear side or a rear surface.

In one example, the display module 150 may be constructed as the touch screen and may be used as the input device in addition to the output device.

The audio output unit 160 receives an audio-processed signal from the controller 180 and outputs the received signal as the audio.

An interface 170 serves as a passage for various types of external devices connected to the display device 100. The interface may be in a wireless scheme using the antenna as well as a wired scheme of transmitting and receiving data via the cable.

The interface 170 may include at least one of a wired/wireless headset port, an external charger port, a wired/wireless data port, a memory card port, a port for connecting a device having an identification module, an audio input/output (I/O) port, a video input/output (I/O) port, and an earphone port.

An example of the wireless scheme may include the broadcast receiver 1210 described above, and may include not only the broadcast signal, but also a mobile communication signal, a short-distance communication signal, a wireless Internet signal, and the like.

The external device interface 171 may transmit or receive data with a connected external device. To this end, the external device interface 171 may include an A/V input/output unit (not shown).

The external device interface 171 may be connected to the external device such as a digital versatile disk (DVD), a Blu-ray, a game console, a camera, a camcorder, a computer (a laptop), a set-top box, and the like in a wired/wireless manner, and may perform input/output operations with the external device.

In addition, the external device interface 171 may establish a communication network with various remote control devices 200 to receive a control signal related to the operation of the display device 100 from the remote control device 200 or to transmit data related to the operation of the display device 100 to the remote control device 200.

The external device interface 171 may include a wireless communication unit (not shown) for short-range wireless communication with other electronic devices. With such a wireless communication unit (not shown), the external device interface 171 may exchange data with an adjacent mobile terminal. In particular, the external device interface 171 may receive device information, running application information, an application image, and the like from the mobile terminal in a mirroring mode.

The network interface 172 may provide an interface for connecting the display device 100 to a wired/wireless network including an Internet network. For example, the network interface 172 may receive content or data provided by the Internet, a content provider, or a network operator via the network. In one example, the network interface 172 may include a communication module (not shown) for connection to the wired/wireless network.

The external device interface 171 and/or the network interface 172 may include a communication module for the short-range communication such as a wireless fidelity (Wi-Fi), a Bluetooth, a Bluetooth low energy (BLE), a Zigbee, and a near field communication (NFC), a communication module for cellular communication such as a long-term evolution (LTE), an LTE advance (LTE-A), a code division multiple access (CDMA), a wideband CDMA (WCDMA), a universal mobile telecommunications system (UMTS), and a wireless broadband (WiBro), and the like.

The user input interface 173 may transmit a signal input by the user to the controller 180 or transmit a signal from the controller 180 to the user. For example, a user input signal such as power ON/OFF, channel selection, screen setting, and the like may be transmitted/received to/from the remote control device 200, a user input signal input from a local key (not shown) such as a power key, a channel key, a volume key, a setting value, and the like may be transmitted to the controller 180, a user input signal input from a sensor unit (not shown) that senses a gesture of the user may be transmitted to the controller 180, or a signal from the controller 180 may be transmitted to the sensor unit.

The controller 180 may include at least one processor, and may control overall operations of the display device 100 using the processor included therein. In this regard, the processor may be a general processor such as a central processing unit (CPU). In one example, the processor may be a dedicated device such as an ASIC or a processor based on other hardware.

The controller 180 may demultiplex the stream input via the tuner 1211, the demodulator 1212, the external device interface 171, or the network interface 172, or process a demultiplexed signal to generate or output a signal for image or audio output.

The image signal image-processed by the controller 180 may be input to the display module 150 and displayed as an image corresponding to the corresponding image signal. In addition, the image signal image-processed by the controller 180 may be input to an external output device via the external device interface 171.

The audio signal processed by the controller 180 may be output as the audio via the audio output unit 160. In addition, the audio signal processed by the controller 180 may be input to the external output device via the external device interface 171. In addition, the controller 180 may include a demultiplexer, an image processor, and the like.

In addition, the controller 180 may control overall operations within the display device 100. For example, the controller 180 may control the tuner 1211 to select (tune) a broadcast corresponding to the channel selected by the user or the pre-stored channel.

In addition, the controller 180 may control the display device 100 in response to a user command input via the user input interface 173 or by an internal program. In one example, the controller 180 may control the display module 150 to display the image. In this regard, the image displayed on the display module 150 may be a still image or a moving image, and may be a 2D image or a 3D image.

In one example, the controller 180 may allow a predetermined 2D object to be displayed within the image displayed on the display module 150. For example, the object may be at least one of a connected web screen (a newspaper, a magazine, and the like), an electronic program guide (EPG), various menus, a widget, an icon, the still image, the moving image, and a text.

In one example, the controller 180 may modulate and/or demodulate a signal using an amplitude shift keying (ASK) scheme. Here, the amplitude shift keying (ASK) scheme may refer to a scheme of modulating the signal by varying an amplitude of a carrier wave based on a data value or restoring an analog signal to a digital data value based on to the amplitude of the carrier wave.

For example, the controller 180 may modulate the image signal using the amplitude shift keying (ASK) scheme and transmit the modulated image signal via a wireless communication module.

For example, the controller 180 may demodulate and process the image signal received via the wireless communication module using the amplitude shift keying (ASK) scheme.

Therefore, the display device 100 may easily transmit and receive a signal with another image display device disposed adjacent thereto without using a unique identifier such as a media access control address (MAC address) or a complex communication protocol such as TCP/IP.

In one example, the display device 100 may further include a photographing unit (not shown). The photographing unit may photograph the user. The photographing unit may be implemented with one camera, but may not be limited thereto, and may be implemented with a plurality of cameras. In one example, the photographing unit may be embedded in the display device 100 or disposed separately upwardly of the display module 150. Information on the image photographed by the photographing unit may be input to the controller 180.

The controller 180 may recognize a location of the user based on the image photographed by the photographing unit. For example, the controller 180 may identify a distance between the user and the display device 100 (a z-axis coordinate). In addition, the controller 180 may determine an x-axis coordinate and a y-axis coordinate within the display module 150 corresponding to the location of the user.

The controller 180 may sense the gesture of the user based on the image photographed by the photographing unit or the signal sensed by the sensor unit, or a combination thereof.

The power supply 190 may supply the corresponding power throughout the display device 100. In particular, the power may be supplied to the controller 180 that may be implemented in a form of a system on chip (SOC), the display module 150 for displaying the image, the audio output unit 160 for outputting the audio, and the like.

Specifically, the power supply 190 may include a converter (not shown) that converts AC power to DC power and a Dc/Dc converter (not shown) that converts a level of the DC power.

In one example, the power supply 190 serves to receive the power from the outside and distribute the power to each component. The power supply 190 may use a scheme of supplying the AC power in direct connection to an external power source, and may include a power supply 190 that may be charged and used by including a battery.

In a case of the former, the power supply is used in connection with the cable, and has difficulties in moving or is limited in a movement range. In a case of the latter, the movement is free, but a weight and a volume of the power supply increase as much as those of the battery, and the power supply must be directly connected to a power cable for a certain period of time for charging or coupled to a charging cradle (not shown) that supplies the power.

The charging cradle may be connected to the display device via a terminal exposed to the outside, or the built-in battery may be charged using a wireless scheme when approaching the charging cradle.

The remote control device 200 may transmit the user input to the user input interface 173. To this end, the remote control device 200 may use the Bluetooth, a radio frequency (RF) communication, an infrared radiation (IR) communication, an ultra-wideband (UWB), the ZigBee, or the like. In addition, the remote control device 200 may receive the image, audio, or data signal output from the user input interface 173 and display the same thereon or output the same as audio.

In one example, the display device 100 described above may be a fixed or mobile digital broadcast receiver that may receive a digital broadcast.

The block diagram of the display device 100 shown in FIG. 1 is only a block diagram for one embodiment of the present disclosure, and each component of the block diagram is able to be integrated, added, or omitted based on specifications of the display device 100 that is actually implemented.

That is, when necessary, two or more components may be combined to each other into one component, or one component may be subdivided into two or more components. In addition, functions performed in each block are for illustrating the embodiment of the present disclosure, and a specific operation or a device thereof does not limit the scope of rights of the present disclosure.

Figure 2:
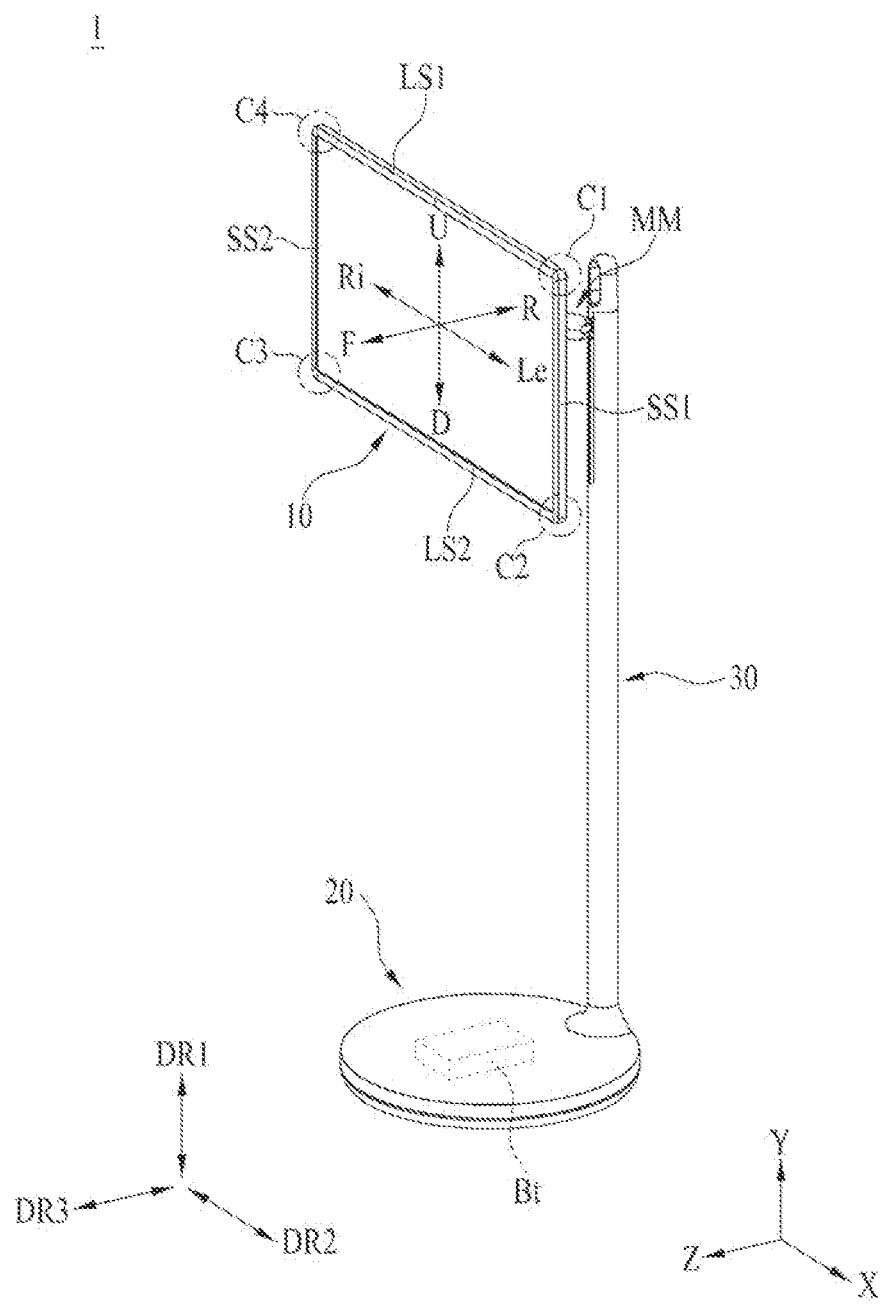
FIG. 2 is a view showing a display device according to an embodiment of the present disclosure.

FIG. 2 is diagram for illustrating a display device according to an embodiment of the present disclosure.

Referring to FIG. 2, a display device 1 may include a head 10. The head 10 may display an image. The head 10 may be referred to as a display 10 or a display unit 10.

The head 10 may include a first long side LS1, a second long side LS2 opposite to the first long side LS1, a first short side SS1 adjacent to the first long side LS1 and the second long side LS2, and a second short side SS2 opposite to the first short side SS1. Although it is shown and described that a length of the first and second long sides LS1 and LS2 is greater than a length of the first and second short sides SS1 and SS2 for convenience of illustration, the length of the first and second long sides LS1 and LS2 may be approximately equal to the length of the first and second short sides SS1 and SS2.

A direction parallel to the short sides SS1 and SS2 of the head 10 may be referred to as a first direction DR1 or a vertical direction. A direction parallel to the long sides LS1 and LS2 of the head 10 may be referred to as a second direction DR2 or a left and right direction. A direction perpendicular to the long sides LS1 and LS2 and the short sides SS1 and SS2 of the head 10 may be referred to as a third direction DR3 or a front and rear direction.

A side on which the head 10 displays the image may be referred to as the front side F and z, and a side opposite thereto may be referred to as the rear side R. A side of the first short side SS1 may be referred to as the left side Le and x. A side of the second short side SS2 may be referred to as the right side Ri. A side of the first long side LS1 may be referred to as the upper side U and y. A side of the second long side LS2 may be referred to as the lower side D.

The first long side LS1, the second long side LS2, the first short side SS1, and the second short side SS2 may be referred to as edges of the head 10. In addition, a point where two of the first long side LS1, the second long side LS2, the first short side SS1, and the second short side SS2 meet each other may be referred to as a corner.

A point where the first short side SS1 and the first long side LS1 meet each other may be a first corner C1. A point where the first short side SS1 and the second long side LS2 meet may be a second corner C2.

A point where the second short side SS2 and the second long side LS2 meet each other may be a third corner C3. A point where the second short side SS2 and the first long side LS1 meet each other may be a fourth corner C4.

Referring to FIG. 1, the display device 1 may include a base 20, a pole 30, and a motion module MM.

The base 20 may have a flat cylinder shape as a whole. The base 20 may be disposed on the ground.

The pole 30 may extend long in the vertical direction. A lower end of the pole 30 may be coupled onto the base 20. The pole 30 may be adjacent to a circumference of a top surface of the base 20. A handle 39 may be coupled to an upper end of the pole 30. The pole 30 and the aforementioned base 20 may be collectively referred to as a stand.

The motion module MM may extend in a direction intersecting the pole 30. One side of the motion module MM may be coupled to a rear side of the head 10. The other side of the motion module MM may be adjacent to the upper end of the pole 30 and may be coupled to the pole 30. An articulating connector 40 may be coupled to the rear side of the head 10, an elevating module 60 may be coupled to the pole 30, and an arm 50 may connect the articulating connector 40 and the elevating module 60 to each other.

Accordingly, the head 10 may be supported by the motion module MM, the pole 30, and the base 20, and may be spaced upward from the ground.

Figure 3:
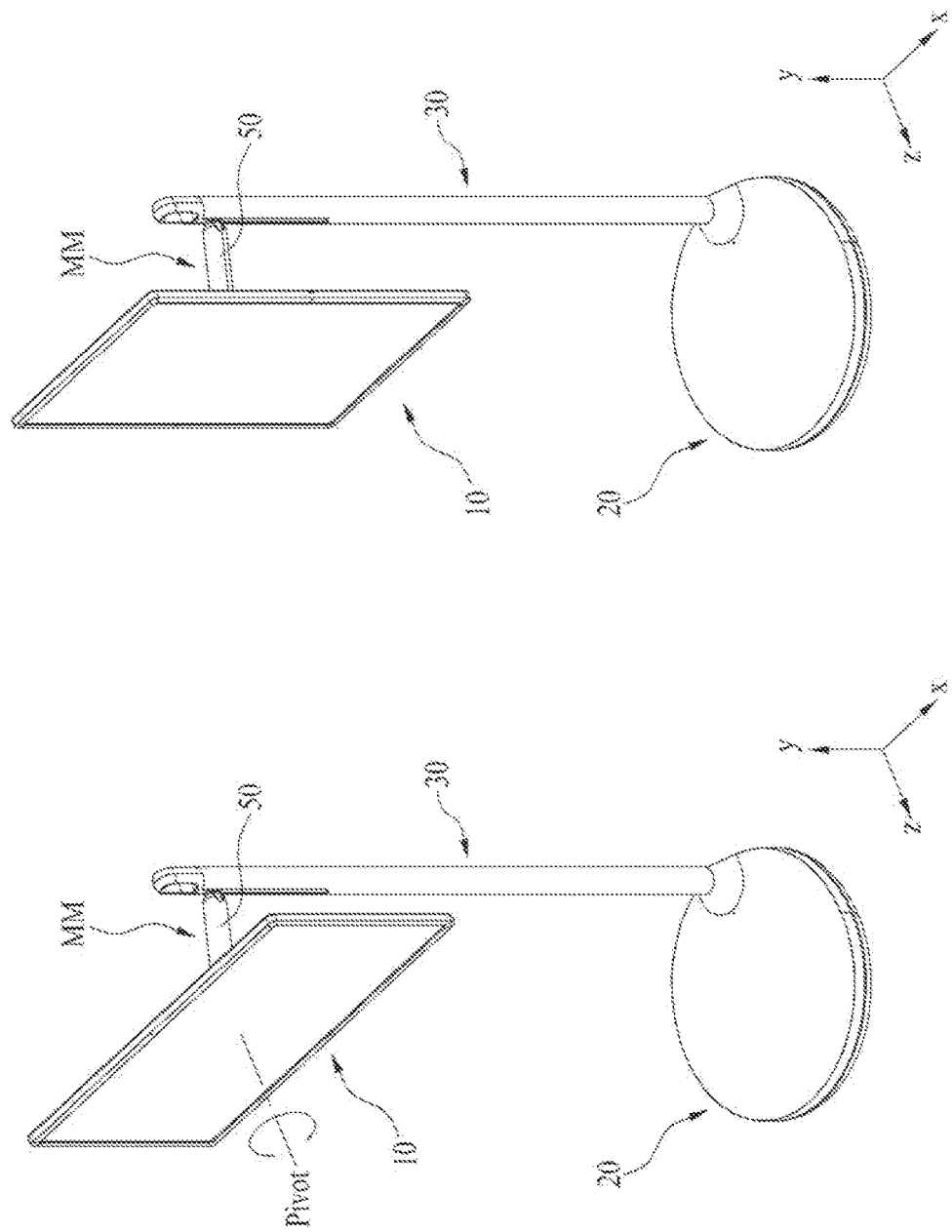
FIG. 3 is a view showing an example of using a display device according to an embodiment of the present disclosure.

Referring to FIG. 3, the head 10 may be spaced upward from the base 20. A user may pivot the head 10. A pivot axis may pass through a center of head 10 and may be orthogonal to the head 10. Referring to a left drawing in FIG. 3, the head 10 may be placed in a landscape mode. Referring to a right drawing in FIG. 3, the head 10 may be placed in a portrait mode.

Figure 4:
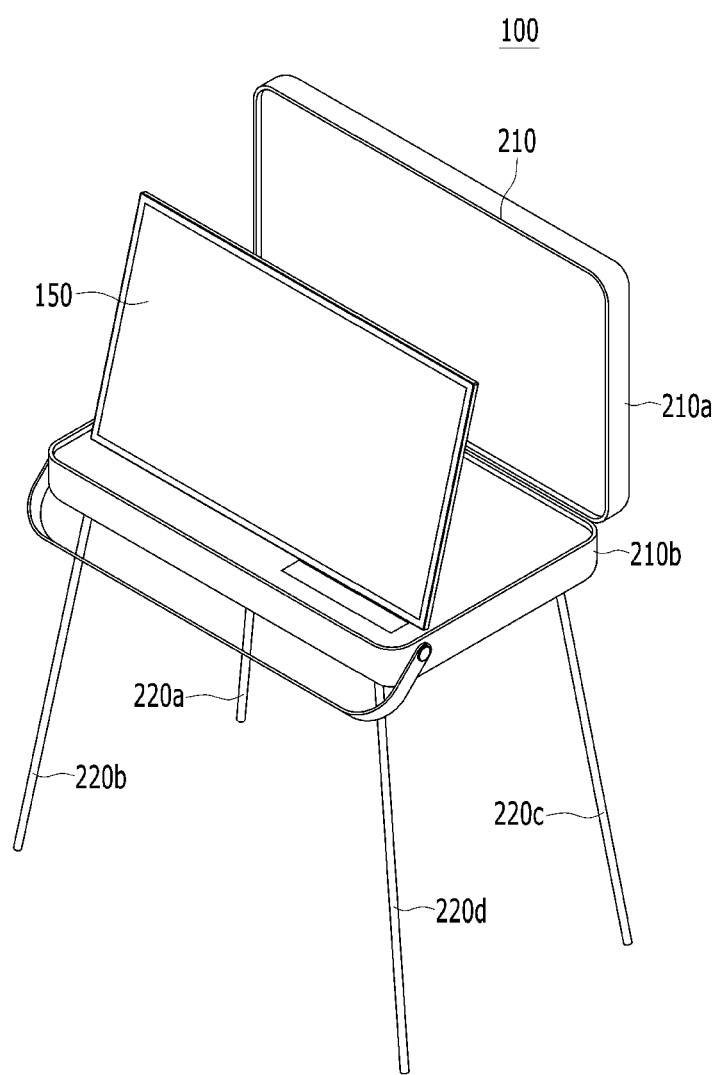
FIG. 4 is another view showing a display device according to an embodiment of the present disclosure.

FIG. 4 is a diagram showing a display device according to an embodiment of the present disclosure. Hereinafter, redundant descriptions duplicate with the above descriptions will be omitted.

Referring to FIG. 4, the display device 100 has the display module 150 accommodated inside a housing 210. In this regard, the housing 210 may include an upper casing 210a and a lower casing 210b, and the upper casing 210a and the lower casing 210b may have a structure of being opened and closed.

In one embodiment, the audio output unit 160 may be included in the upper casing 210a of the display device 100, and the main board that is the controller 180, a power board, the power supply 190, the battery, the interface 170, the sensing unit 120, and the input unit (including the local key) 130 may be accommodated in the lower casing 210b. In this regard, the interface 170 may include a Wi-Fi module, a Bluetooth module, an NFC module, and the like for the communication with the external device, and the sensing unit 120 may include an illuminance sensor and an IR sensor.

In one embodiment, the display module 150 may include a DC-DC board, a sensor, and a low voltage differential signaling (LVDS) conversion board.

In addition, in one embodiment, the display device 100 may further include four detachable legs 220a, 220b, 220c, and 220d. In this regard, the four legs 220a, 220b, 220c, and 220d may be attached to the lower casing 210b to space the display device 100 from the floor.

Figure 5:
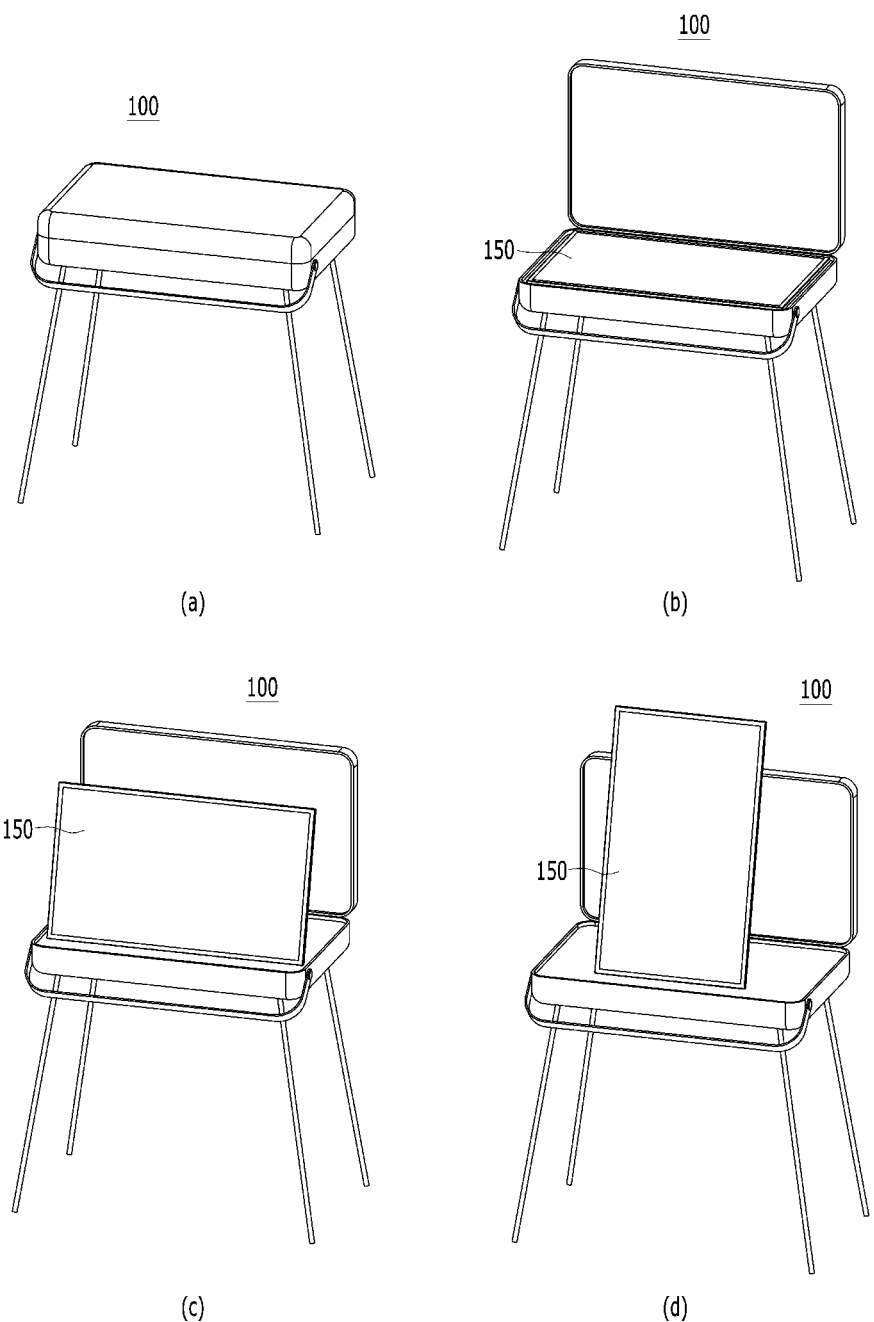
FIG. 5 is another view showing an example of using a display device according to an embodiment of the present disclosure.

FIG. 5 is another diagram showing an example of utilization of a display device according to an embodiment of the present disclosure. Hereinafter, redundant descriptions duplicate with the above descriptions will be omitted.

In one embodiment of the present disclosure, the display device 100 may include four legs. In this regard, the four legs are attached to the lower casing to space the display device 100 from the floor.

Accordingly, the user may not only use the display device 100 while moving the same, but also use the same at a fixed location away from the floor. (a) to (d) in FIG. 5 show an example of utilization in which the legs of the display device 100 are attached and the display device 100 is used at the fixed location. In this regard, (a) in FIG. 5 shows a state in which the upper casing of the display device 100 is closed, and (b) to (d) in FIG. 5 show a state in which the upper casing is opened.

Specifically, (b) in FIG. 5 shows a state in which the display module 150 is accommodated in the lower casing with the upper casing open. In other words, (b) in FIG. 5 shows a state in which the display module 150 lies inside the lower casing with the upper casing open. Even in the state in which the display module 150 is accommodated in the lower casing, the display module 150 may be activated.

In one embodiment, the display device 100 may provide an edit mode while the display module 150 is accommodated in the lower casing. In this regard, the edit mode may include a function of adding at least one of a memo function, a drawing function, and a voice recording function to a content.

That is, when the display module 150 is mounted on the lower casing, the display device 100 may determine that the user intends to appreciate/watch the content via the display module 150.

On the other hand, when the display module 150 is accommodated in the lower casing, the display device 100 may determine that the user intends to edit the content output on the display module 150. Accordingly, the display device 100 may provide a function of editing the content when the display module 150 is accommodated in the lower casing.

(c) in FIG. 5 shows a state in which the display module 150 is horizontally mounted on the lower casing with the upper casing open, and (d) in FIG. 5 shows a state in which the display module 150 is vertically mounted on the lower casing with the upper casing open. In this regard, (c) and (d) in FIG. 5 show a state in which the display module 150 is erected using the lower casing as a foothold.

In addition, in one embodiment, the display device 100 may automatically accommodate or mount the display module 150 in or on the lower casing using a motor (not shown).

More specifically, when the upper casing of the display device 100 is opened, the display module 150 may be automatically mounted horizontally or vertically on the lower casing.

In addition, in another embodiment, when the upper casing of the display device 100 is opened, the display module 150 may be primarily accommodated on the lower casing. Thereafter, the display device 100 may mount the display module 150 on the lower casing in response to a signal of touching the display module 150 and a signal input from the sensing unit or the input unit. For example, the user may mount the display module 150 on the lower casing by pressing the display module 150 accommodated inside the lower casing downwardly.

FIG. 6 is a view for explaining an image in which conventional problems may occur. Prior to explaining the image, functions or services provided by the display device 100 where such issues may arise will be described.

The display device 100 has a function of displaying a standby screen when no specific application or service is activated. The standby screen display function sequentially displays several preselected images (photos) on the display 150. The images displayed on the standby screen may be those exchanged by the user online through smartphones or other devices, resulting in the issue of mismatched resolution for the display 150.

The image shown in (a) of FIG. 6 has an aspect ratio where the width is longer than the height. Such an image may be referred to as a landscape image. If a landscape image is displayed while the display 150 is oriented vertically as shown in (d) of FIG. 4 (i.e., portrait mode), an erroneous image completely unrelated to the intention of a video creator or distributor (hereinafter referred to as "image provider") may be displayed as shown in (b) of FIG. 6. That is, the person corresponding to the main object of (a) in FIG. 6 is not displayed in (b) of FIG. 6.

Accordingly, a method of detecting the central area of an original image and extracting an image including the central area from the original image through image processing is proposed in this specification. The extracted image may be displayed on a display, and the extracted image which may be provided as the standby screen display function described above.

The following operations described below may be performed by the display device 100 or the control unit 180 (hereinafter referred to as "controller") of the display device 100.

FIG. 7 illustrates an original image and partial images extracted therefrom according to various methods. In FIG. 7, (a) shows the original image, and (b), (c), (d), and (e) show partial images extracted from the original image in different ways. Each of the partial images corresponds to a portion of the original image extracted by detecting and capturing a central area including at least one object from the original image.

Hereinafter, methods of extracting partial images will be described.

First, an attention map will be described. The attention map represents an image by assigning an attention score (referred to as "score") between 0 and 1 to each pixel in an image. If the original image has a resolution of 1920×1080, each of the 1920×1080 pixels is assigned a score. This score represents whether the pixel contains an object capable of characterizing the image (or the probability of object presence), which is assigned a value between 0 and 1. In other words, a value closer to 1 is assigned to a pixel with a high probability of object presence (or a pixel corresponding to the object), while a value of 0 is assigned when it is determined that there is no probability of object presence. For example, pixels corresponding to people in the image may have a score close to 1, while pixels corresponding to the background may have a score close to 0.

As one method of extracting partial images, it is proposed to move (slide) a sliding window with a predefined size across all areas of an original image and extract, as a partial image, an area where the sum of scores is maximized. The sliding window may have a rectangular shape. In FIG. 7, (b) shows a partial image obtained based on this method from the original image in (a) of FIG. 7.

As another method of extracting partial images, it is proposed to extract, as a partial image, an area including all pixels each having a score higher than or equal to a predetermined score or a score within a predetermined range among all pixels of an original image. The predetermined score may be, for example, 0.9, and the partial image or area corresponding thereto may have a rectangular shape. In addition, the predetermined range may be, for example, the top n1% (where n1 is a rational number greater than 0, and the partial image or area corresponding thereto may have a rectangular shape.

In FIG. 7, (c) and (d) show a partial image extracted in a rectangular shape including all pixels with scores higher than 0.95 and a partial image extracted in a rectangular shape including all pixels with scores corresponding to the top 1%, respectively.

As a further method of extracting partial images, it is proposed to adjust the scores of all pixels of an original image, move (slide) a sliding window with a predetermined size across all areas of the original image, and extract, as a partial image, an area where the sum of adjusted scores is maximized. The sliding window may have a rectangular shape. In FIG. 7, (e) shows a partial image obtained based on this method from the original image in (a) of FIG. 7. The score adjustment is performed by setting the scores of pixels to a predetermined value (e.g., 0)), except for pixels whose scores are higher than or equal to the top n2% (where n2 is a rational number greater than 0 among all pixels of the original image. Alternatively, the score adjustment may be performed by maintaining the scores of pixels whose scores are higher than or equal to the top n2% (where n2 is a rational number greater than 0 to their original scores or setting the scores to a predetermined value (e.g., 1).

Figure 8:
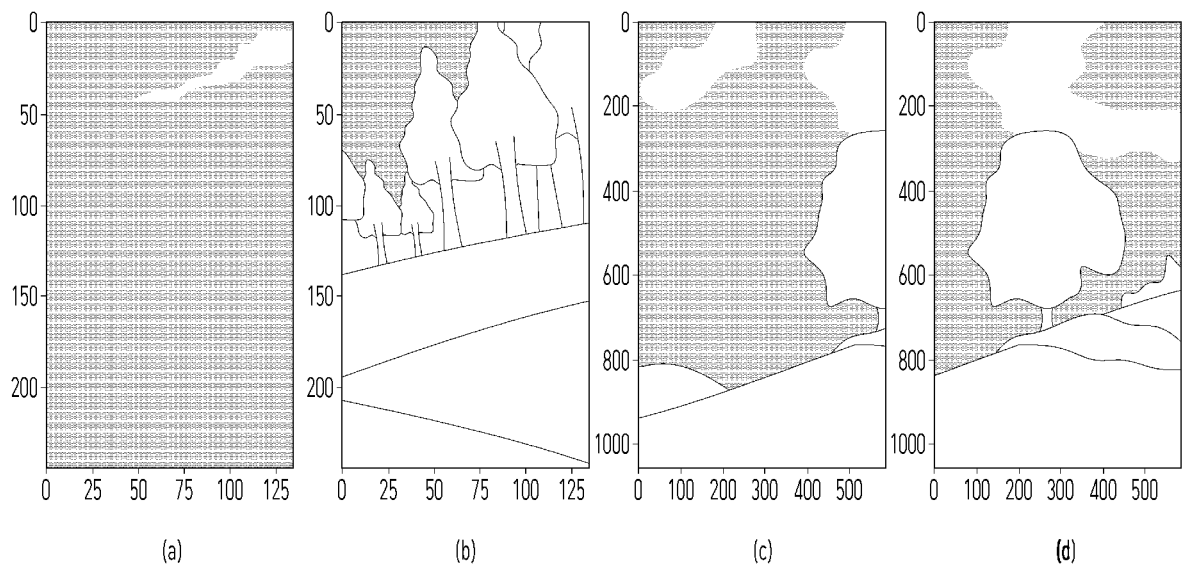
FIG. 8 illustrates output images obtained by cropping one of the partial images of FIG. 7 according to various methods.

FIG. 8 illustrates output images obtained by cropping the original image in (a) of FIG. 7 or the partial image in (d) of FIG. 7 among the partial images of FIG. 7. There are several ways to obtain an output image by cropping a partial image. In this specification, cropping methods are categorized based on the size (ratio) of a cropping window and the reference point for zoom-in. The methods used to obtain the images in FIG. 8 are distinguished by two cropping window sizes and two different reference points for zoom-in. Each method is formed by combining the cropping window sizes and the reference points for zoom-in.

TABLE 1

|  | Default cropping window size | Enlarged cropping window size |
|---|---|---|
| Zoom-in based on center of partial image | (a) of FIG. 8 | (c) of FIG. 8 |
| Zoom-in based on pixel with highest score in partial image | (b) of FIG. 8 | (d) of FIG. 8 |

The cropping window size (or cropping size) may be determined based on at least one of: the aspect ratio of the display module 150 (hereinafter referred to as "display") of the display device 100, which is the ratio of the horizontal and vertical lengths of the display (e.g., 16:9, 9:16, 4:3, 3:4, etc.), the resolution (or size) of the original image, and the resolution (or size) of the partial image.

Basically, the ratio (of the width and height) of the cropping window is determined based on the resolution of the display 150, and the resolution of the display 150 is determined by the rotation direction or state (i.e., landscape mode or portrait mode) of the display 150.

For example, when the resolution of the display 150 is 1920×1080 (FHD), if the display 150 operates in the landscape mode, the aspect ratio of the cropping window is 16:9, and if the display 150 operates in the portrait mode, the aspect ratio of the cropping window is 9:16.

Additionally, the size of the cropping window may be limited by the resolution (or size) of a partial or original image. Since image cropping refers to cutting out a partial or original image, the cropping window may not be larger than the partial or original image. Specifically, the maximum size of the cropping window is achieved when the longer one of the width and height of the cropping window matches the width or height of the image (partial or original image). For example, when the aspect ratio of the cropping window is 16:9, the width of the cropping window is larger than the height thereof, and thus, the maximum size of the cropping window is attained when the width of the cropping window matches the width of the image (partial image or original image).

Additionally, the cropping window used for cropping the partial image may be configured to have the maximum size to prevent degradation in image quality.

Referring back to FIG. 8, the height is larger than the width in each of the images of FIG. 8. The images in FIG. 8 are for cases where the display 150 is in the portrait mode, and all images in FIG. 8 have an aspect ratio of 16:9. In other words, before cropping the partial or original image, the controller 180 detects the rotation direction (state) of the display 150 (i.e., whether the display 150 is in the landscape mode or portrait mode) and determines the aspect ratio of the cropping window. Additionally, the size of the cropping window and the size of an output image are determined depending on whether cropping is performed on the original or partial image.

In FIG. 8, (a) and (b) show output images obtained by cropping a partial image (i.e., (d) of FIG. 7), and (c) and (d) show output images obtained by cropping an original image (i.e., (a) of FIG. 7).

In FIG. 8, (a) and (c) show output images obtained by zooming in and cropping each image based on a pixel located in the center (coordinate midpoint) of a partial image thereof, and (b) and (d) show output images obtained by zooming in and cropping each image based on a pixel with the highest score in a partial image thereof.

The zoom-in operation related to cropping will be described with reference to FIG. 9. The zoom-in refers to an operation of enlarging an image around a specific location and then displaying the enlarged image. However, since cropping refers to cutting out a portion of the image, the resolution does not increase. If each of the four images shown in FIG. 8 is displayed on the full screen of the display 150 in the portrait mode, it may be interpreted as enlarging and displaying a specific portion of each image unlike displaying the entirety of the original image ((a) in FIG. 7) or partial image ((d) in FIG. 7) on the display 150.

Figure 9:
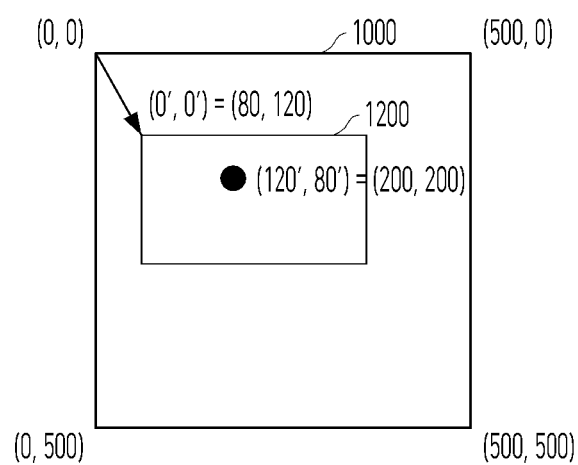
FIG. 9 is a view for explaining zooming in and cropping of an image.

FIG. 9 is a view for explaining zooming in and cropping of an image.

Hereinafter, a process of zooming in and cropping a partial or original image 1000 when the partial or original image 1000 is given. In the proposed technology, zoom-in not only involves enlarging an image but also determining the relative position of a specific portion (i.e., a first pixel or a first pixel area) of a cropped image. The zoom-in means that instead of simply cropping a partial image such that pixel(s) with a high score in the partial image or area(s) thereof are located in the center of a cropped output image, the relative positions in an original image are preserved in the output image to achieve a more natural output image.

Hereinafter, the present disclosure will be described based on the original image (1000).

It is assumed that a first pixel P is a pixel with the highest score in calculating the attention map. In other words, the first pixel P is a pixel where an important object is located and corresponds to the significant part of an image. Generally, it would be typical to place the significant part in the center of an output image. However, as described above, it is proposed to zoom in and crop the image such that the relative position of the significant part of the original image is maintained in the output image. In other words, it is proposed to maintain the relative position of the first pixel P from the original image in the cropped image, that is, in the output image.

The original image 1000 has a resolution of 500×500 pixels. The position of the first pixel P in the original image 1000 is assumed to be (200, 200) with respect to the top-left pixel (coordinates (0, 0))) of the original image 1000. The relative position of the first pixel P is defined as follows: the first pixel P is located at {horizontal, vertical}={40%, 40%} of the original image 1000. Therefore, to maintain this relative position in a cropping window 2000 (cropped image or output image), the controller 180 may configure the position of the cropping window 2000 such that the first pixel P is also located at {horizontal, vertical}={40%, 40%} of the cropping window 2000. The cropping window 2000 may have a resolution of 300×200 pixels, which corresponds to a transformed coordinate. Assuming that the top-left pixel of the cropping window 2000 is (0', 0'), the bottom-right pixel and the first pixel P are represented as (300', 200° and (120', 80'), respectively. Therefore, when the position of the cropping window 2000 is expressed with respect to the reference coordinates of the original image 1000, the top-left pixel and the bottom-right pixel correspond to (80, 120) and (380, 320), respectively. The position of the first pixel P in the original image 1000 is slightly towards the top-left corner, and the position of the first pixel P in the cropping window 2000 is also slightly towards the top-left corner. This ensures that the relative position remains the same. The image shown in (d) of FIG. 8 corresponds to a partial image obtained by zooming in and cropping the image shown in (a) of FIG. 7 while maintaining the same relative position of the first pixel P.

Above, it is assumed that the first pixel P is the pixel with the highest score during the attention map calculation process. However, the first pixel P may be a pixel located in the center of a partial image (i.e., center pixel) or any pixel, i.e., a third pixel. The third pixel corresponds to a pixel within the partial image (or original image) that is selected by the user through the user interface. In other words, the third pixel refers to a pixel selected by the user.

The image shown in (c) of FIG. 8 corresponds to a partial image obtained by zooming in and cropping the image shown in (a) of FIG. 7 while maintaining the same relative position of the first pixel P having the highest score.

Instead of using one pixel, a pixel area composed of a plurality of pixels may be used for zooming in and cropping. For the pixel area, the relative positions of original and output images may be matched using the center pixel of the area or the coordinates thereof.

Hereinabove, zooming in and cropping the original image 1000 has been described, but zooming in and cropping a partial image is also allowed. In other words, the relative position of the first pixel or the first pixel area in the partial image may serve as the relative position of the first pixel or the first pixel area in the output image 2000 during the zooming in and cropping process.

Figure 10:
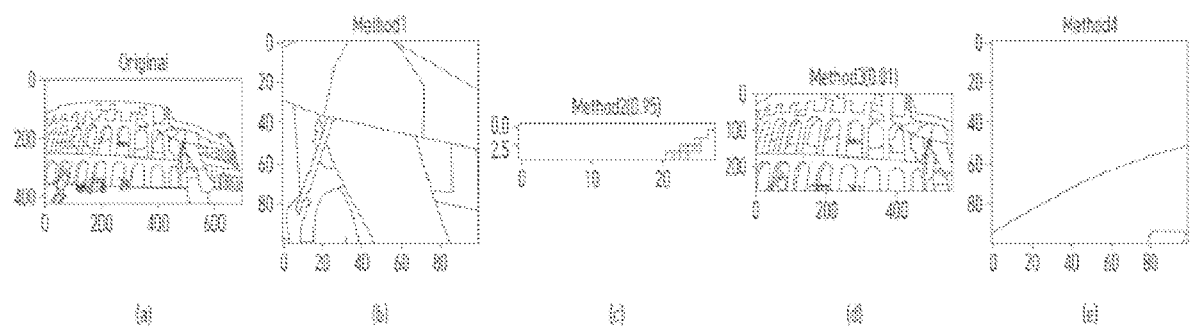
FIG. 10 illustrates an original image and partial images extracted therefrom according to various methods.

FIG. 10 illustrates an original image and partial images extracted therefrom according to various methods.

The images in (b) to (e) of FIG. 10 correspond to partial images obtained from the original image shown in (a) of FIG. 10. The partial images are obtained according to the partial image acquisition methods described in (b) to (e) of FIG. 7, respectively.

Figure 11:
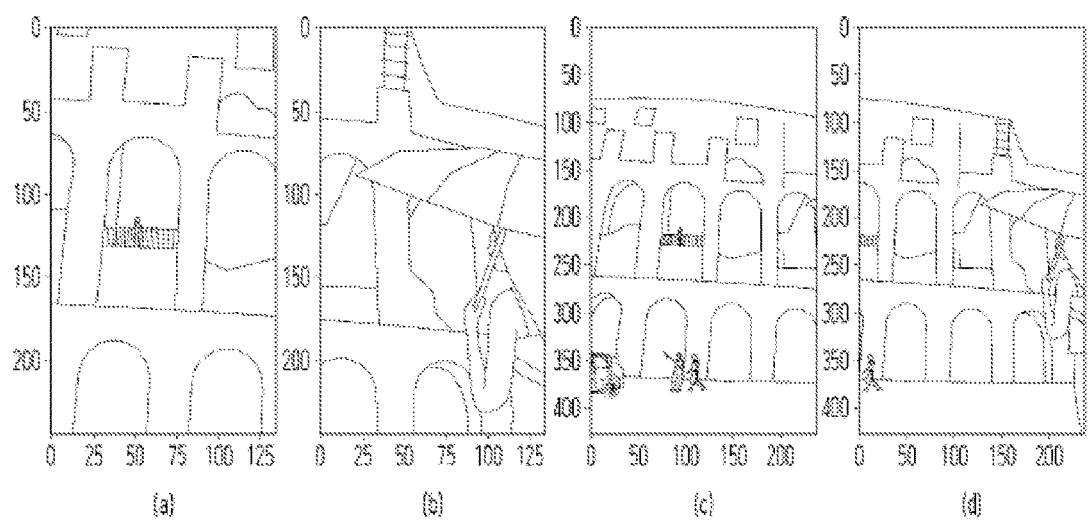
FIG. 11 illustrates output images obtained by cropping one of the partial images of FIG. 10 according to various methods.

FIG. 11 illustrates output images obtained by cropping one of the partial images of FIG. 10 according to various methods. The images shown in (a) to (d) of FIG. 11 correspond to output images obtained from the image shown in (d) of FIG. 10, in the same way as the images shown in (a) to (d) of FIG. 8 are obtained from the image shown in (d) of FIG. 7.

The original images shown in FIGS. 6, 7, 8, 10, and 11 are landscape mode images, each having a horizontal length greater than a vertical length, and image processing for displaying the images when the display 150 is in the portrait mode is described. However, the present disclosure may be applied in the same way as described above to image processing when an original image is in the portrait mode and the display 150 is in the landscape mode.

In FIG. 12, (a) illustrates an original image in the portrait mode, (b) illustrates a partial image obtained by simply cropping the central part of the original image and displayed on the display 150 in the landscape mode, and (c) illustrates a partial image obtained by zooming in and cropping the original image based on an area where the main object is located (the first pixel P) according to the processing method described above and displayed on the display 150.

FIGS. 13 to 18 are flowcharts of methods of obtaining an output image by processing an original image and displaying the output image. The methods shown in FIGS. 13 to 18 are performed by the display device 100 or the controller 180. For simplicity, the methods will be described on the assumption that the display device 100 performs these methods.

The display device 100 obtains the original image (S1310). The original image is stored in a storage medium embedded in the display device 100 such as a memory or received through wired or wireless communication.

The display device 100 processes the obtained original image (S1320). The processing of the original image is performed according to at least some of the methods described with reference to FIGS. 7 to 12. Basically, the image processing includes adjusting the original image to be suitable for the rotation state and/or resolution (including the aspect ratio) of the display 150 of the display device 100. The image obtained by processing the original image to be displayed on the display 150 is referred to as the output image.

The display device 100 displays the output image on the display 150 (S1330).

Figure 14:
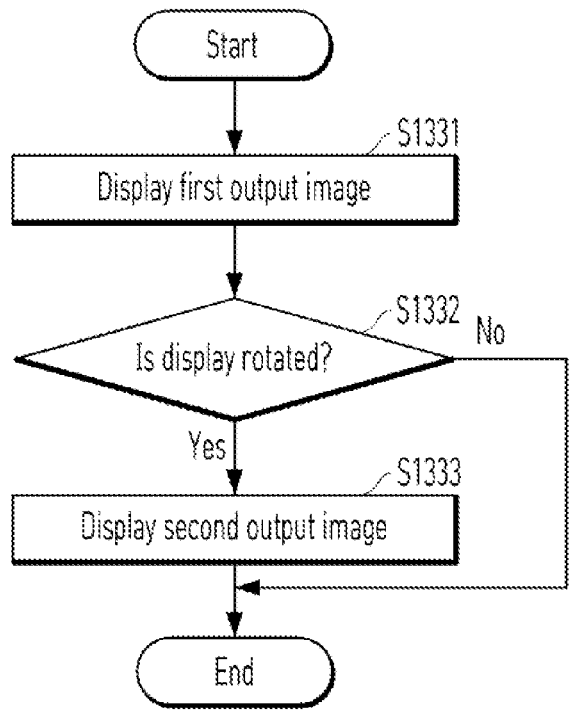

FIG. 14 illustrates a flowchart for displaying an output image when the display 150 is rotated. The original images shown in FIGS. 6, 7, 8, 10, and 11 are landscape mode images, where the width is greater than the height, and image processing for these original images on the display 150 in the portrait mode is described. However, the image processing may be applied when the rotation state of the display 150 changes, that is, when the display 150 is rotated.

The display device 100 may display a first output image on the display 150 (S1331). When the display 150 is in the landscape mode, the first output image is obtained by processing the original image to be suitable for the landscape mode. When the display 150 is in the portrait mode, the first output image is obtained by processing the original image to be suitable for the portrait mode.

The display device 100 may detect rotation of the display 150 (S1332). When the rotation of the display 150 is detected, the display device 100 may display a second output image on the display 150 (S1333). The second output image is obtained from the original image, and the original image of the first output image and the original image of the second output image are the same. In other words, the second output image is obtained by processing the original image of the first output image.

When the rotation of the display 150 is detected, the display device 100 may obtain the second output image by processing the original image of the first output image. Alternatively, the display device 100 may store the second output image in advance in a storage medium. When the rotation of the display 150 is detected, the display device 100 may call the stored second output image.

If the first output image is a landscape mode image, the second output image may be a portrait mode image. In other words, the aspect ratios of the first output image and the second output image are opposite to each other. For example, if the first output image has an aspect ratio of 16:9, the second output image may have an aspect ratio of 9:16.

Figure 13:
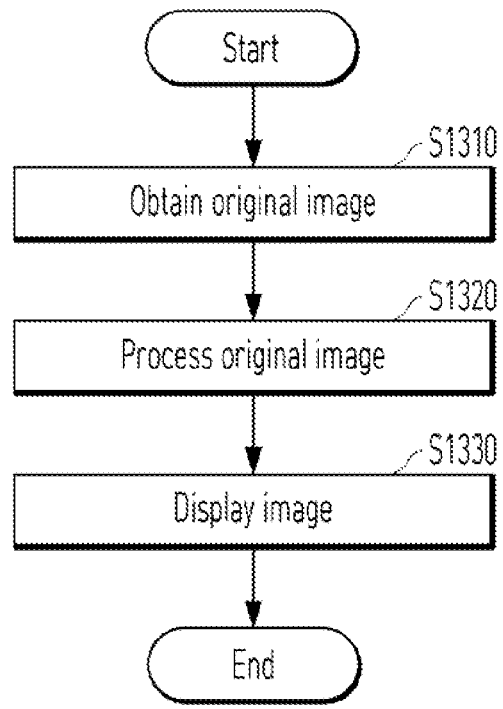
FIGS. 13 to 18 are flowcharts of methods of obtaining an output image by processing an original image and displaying the output image.
Figure 15:
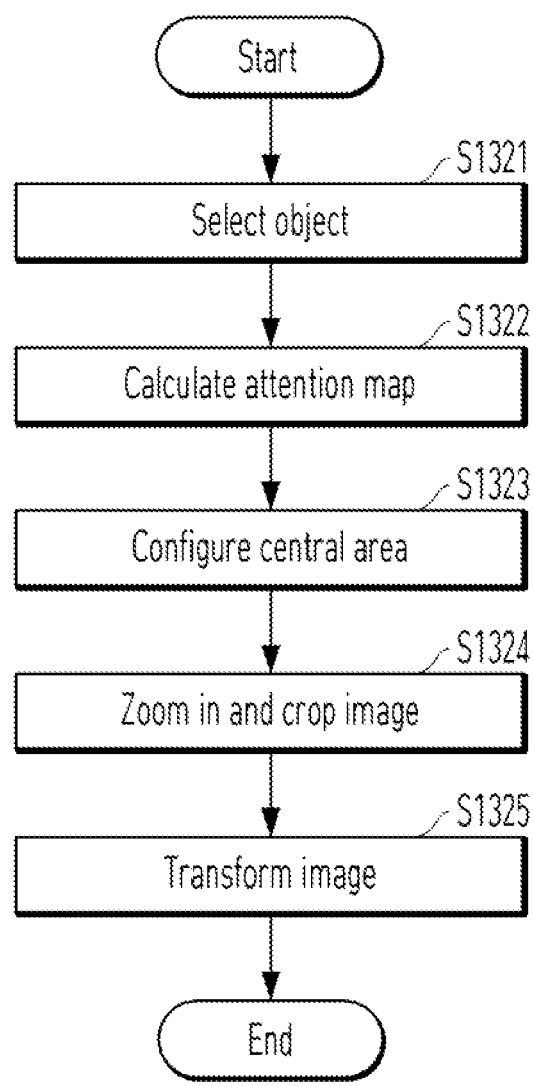

FIG. 15 is a flowchart for explaining in detail the image processing process (S1320) of FIG. 13.

The display device 100 may select an object from an original image that is stored in the memory 140 or received through wired or wireless communication (S1321). The object selection may be input from the user through the user interface, and if there is no user input, a person or an animal may be selected by default. In the object selection, a plurality of objects may be selected.

The display device 100 may calculate an attention map according to the results of the object selection (S1322).

The display device 100 may configure a central area in the original image based on the results of calculating the attention map (S1323). The configured central area constitutes a partial image, and accordingly, the partial image is extracted from the original image. The details of the extraction of the partial image are found in FIG. 7 and related descriptions.

Additionally or alternatively, the display device 100 may display the extracted partial image on the display 150 and receive a user input for the partial image. Details thereof are found in FIG. 16 and related descriptions.

The display device 100 may display the obtained partial image on the display 150 and display a request for inputs for the central area on the display 150 (S13231).

The display device 100 may check whether there is an input for the central area through the user interface (S13232). When the input for the central area through the user interface is detected, the display device 100 may set an input area as a partial image (S13233). Alternatively, the display device 100 may re-extract a partial image including the input area from the original image.

Then, the display device 100 may analyze information on the newly configured central area, convert the analyzed results into a database, and store the results in the memory 140 (S13234). For example, the display device 100 may extract and store the characteristics of a central area reconfigured by the user or the characteristics of an object included therein. In addition, the display device 100 may store the number of processing and patterns of the central area. The stored information may be used when the display device 100 obtains a central area or partial image from an original image in the future. That is, the above information may be used for an algorithm for configuring a central area in an original image. Returning to FIG. 15, the explanation is resumed.

The display device 100 may zoom in and crop the extracted or configured partial image to obtain an output image from the extracted or configured partial image (S1324). Details of zooming in and cropping may be found in FIGS. 8 and 9 and related descriptions.

Additionally or alternatively, when acquiring a plurality of output images, the display device 100 may display the plurality of output images on the display 150 and receive a user input for the output images. In this case, each of the plurality of output images is obtained from the original or partial image in a different way. Details thereof will be described with reference to FIG. 17.

The display device 100 may arrange and display the plurality of obtained output images on the display 150 (S1334). The display device 100 may display a user interface for selecting one of the plurality of output images arranged on the display 150.

The display device 100 may detect selection of one of the plurality of output images (S1335). Once the selection of the output image is detected, the display device 100 may set the selected image as the output image (S1336). Then, the display device 100 may store the method of obtaining the selected output image as user preference information. The display device 100 may use the user preference information when acquiring output images in the future. Returning to FIG. 15, the explanation is resumed.

The display device 100 may determine whether the obtained output image is smaller than the resolution of the display 150 or how much smaller the obtained output image is than the resolution of the display 150. If the obtained output image is smaller than a predetermined criterion, the display device 100 may use image quality enhancement techniques such as super resolution to transform the output image (S1325). This is done to compensate for the visual degradation that would be easily noticed if the output image were directly displayed on the display 150.

The display device 100 may provide additional functions before displaying the output image or the transformed output image. Details thereof will be described with reference to FIG. 18.

The display device 100 may determine whether the output image or the transformed output image is suitable for displaying on the display 150 before displaying the corresponding image (S1337).

The criteria for determining whether the output image or the transformed output image is suitable for displaying on the display 150 may include the rotation state of the display 150. For example, when the output image is a landscape image, if the current state of the display 150 is the portrait mode, it may be determined that the corresponding output image is not suitable for displaying on the display 150.

Furthermore, the criteria for determining whether the output image or the transformed output image is suitable for displaying on the display 150 may include the following factors: whether all objects identified as main objects are included in the output image or whether some of the main objects are cropped.

The display device 100 may include only output images that are suitable for displaying in a group for image display, which is provided as the standby screen display function (S1338). On the other hand, the display device 100 may exclude output images that are not suitable for displaying from the group for image display (S1339).

Considering that a plurality of images are displayed on the display 150 as the standby screen display function, as described above, the above operation is done to ensure that only the output images suitable for displaying on the display 150 are included as display targets.

Figure 16:
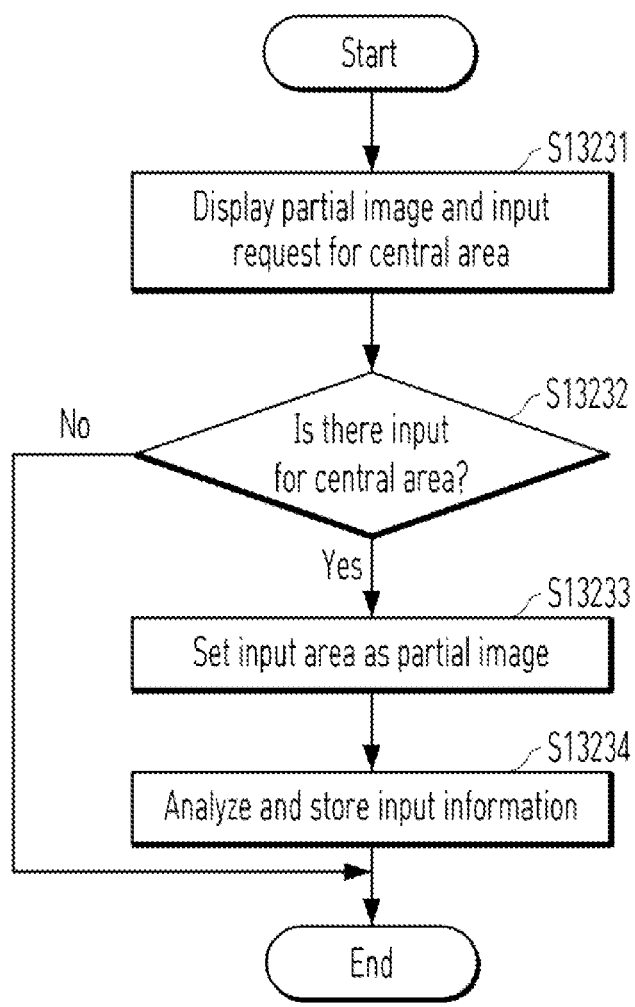
Figure 19:
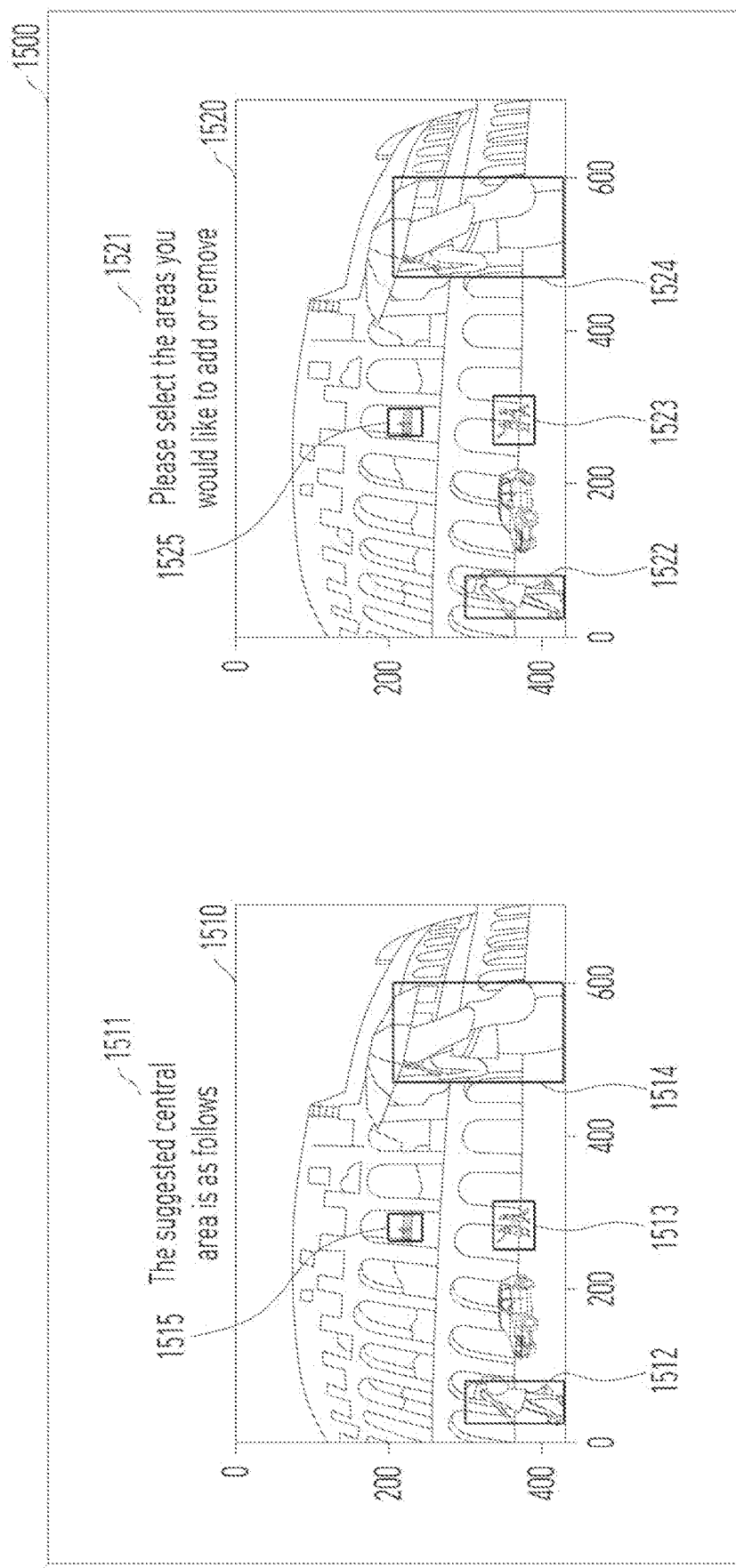
FIG. 19 illustrates an exemplary user interface for displaying the processes described in FIG. 16 on a display.

FIG. 19 illustrates an image 1500 displayed on the display 150. As shown on the left of FIG. 19, the display device 100 may display an original image 1510 and markers 1512, 1513, 1514, and 1515 for identifying central areas or objects detected from the original image on the display 150. In addition, the display device 100 may output a guide comment 1511 for the detected objects or central areas. As shown on the right of FIG. 19, the display device 100 may display an original image 1520 and a comment 1521 requesting inputs for removing the detected central areas or objects or adding new central areas or objects. The display device 100 may provide a user interface (UI) for adding or removing (i.e., updating) the objects or central areas. For instance, when detecting touch inputs from the user within the currently displayed central areas 1522, 1523, 1524, and 1525 in the original image 1520, the display device 100 may remove or add the markers of the objects or central areas corresponding to the detected touch inputs. Then, the display device 100 may re-extract a partial image from the original image, including the removed or added objects or central areas. By doing so, the display device 100 may receive inputs for central areas as shown in FIG. 16.

Figure 20:
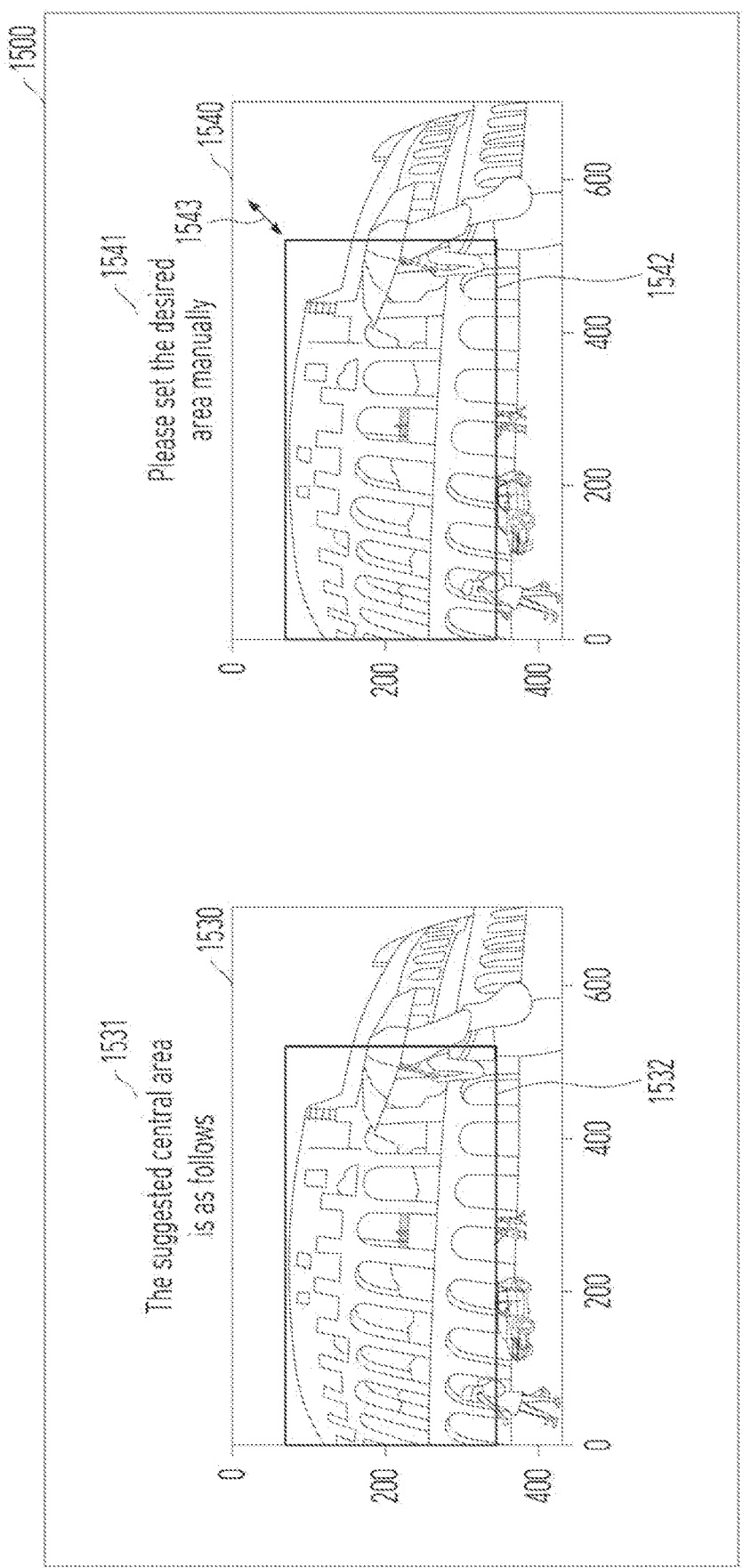
FIG. 20 illustrates an exemplary user interface for displaying the processes described in FIG. 16 on a display.

FIG. 20 illustrates an image 1500 displayed on the display 150. As shown on the left of FIG. 20, the display device 100 may display an original image 1530 and the area of an extracted partial image 1532 on the display 150, along with a guide comment 1531. In addition, as shown on the right of FIG. 20, the display device 100 may display an original image 1540 and an input UI 1543 for a central area 1542 on the display 150, along with a guide comment 1541 requesting inputs for the central area 1542. This allows the display device 100 to receive inputs for central areas as shown in FIG. 16.

The UIs shown in FIG. 19 and FIG. 20 may be configured to be displayed on the display 150 in association with each other. For example, if the number of updates through the UI shown in FIG. 19 or the time taken for updating objects or central areas through the UI shown in FIG. 19 exceeds a predefined threshold, the UI shown in FIG. 20 may be provided. In other words, two types of means for updating objects or central areas in an original image are provided. Additionally, the order of the two types of means may change.

Figure 17:
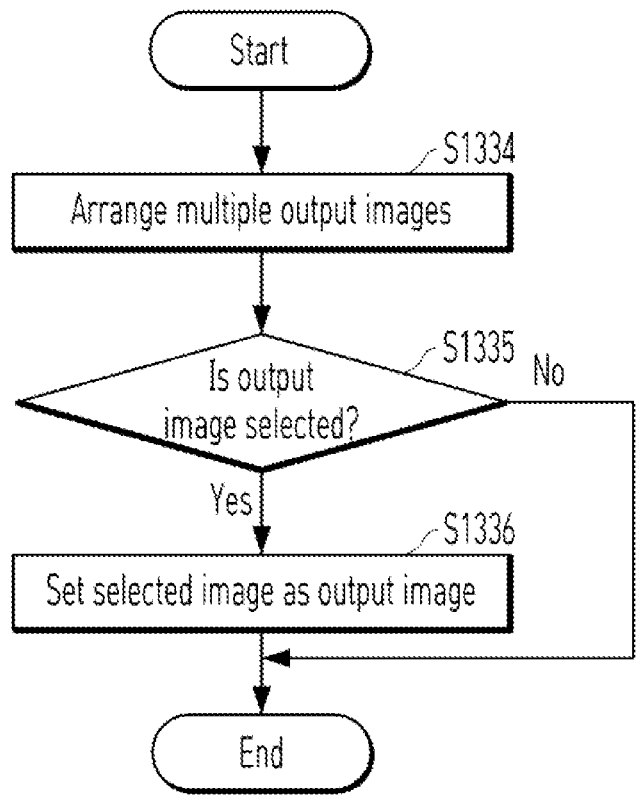
Figure 18:
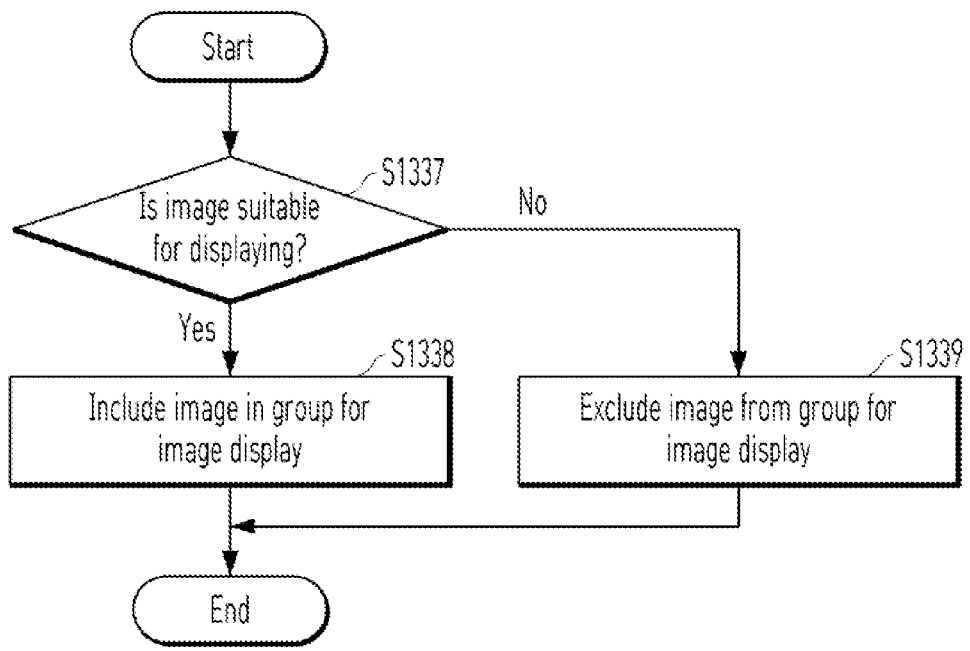

FIG. 21 illustrates an example of an image 1500 including a UI for displaying the process described in FIG. 17 on the display. The display device 100 may arrange and display a plurality of output images 1550 on the display 150. In addition, the display device 100 may also display a comment 1551 guiding selection of one of the plurality of output images and a user selection input UI 1552 for selecting one of the plurality of output images. If a user touch input is detected on the user selection input UI 1552, the display device 100 may display a selection input confirmation indicator 1553 within the corresponding user selection input UI 1552. The display device 100 may then set the selected image as an output image.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the scope of the disclosure. Therefore, the present disclosure is not limited to the embodiments disclosed herein but intends to give the broadest scope consistent with the new principles and features disclosed herein.

What is claimed is:

1. A display apparatus configured to rotate around a fixed axis, the display apparatus comprising:
   a display configured to rotate around the fixed axis and display an image; and
   a controller configured to process an original image and control the display to display the original image, wherein the original image is stored in a memory or received through wired or wireless communication,
   wherein the controller is configured to:
     obtain an output image by processing a central area including an object in the original image to be suitable for a rotation state of the display and a resolution of the display; and
   control the display to display the obtained output image, wherein the controller is further configured to:
     calculate a score indicating a likelihood of existence of an object for each pixel of the original image,
     extract at least one partial image corresponding to the central area from the original image based on the score; and
     obtain the output image by cropping a portion of the partial or original image based on a position of a specific part of the partial image.

2. The display apparatus of claim 1, wherein the controller is configured to:
   detect a change in the rotation state of the display; and
   control the display to display a second output image instead of a first output image which had been displayed on the display, based on the change in the rotation state,
   wherein the second output image is obtained by processing an original image of the first output image,
   wherein the second output image is pre-stored in the memory or obtained by the controller by processing the original image of the first output image based on the detection of the change in the rotation state, and
   wherein an aspect ratio of the second output image is opposite to an aspect ratio of the first output image.

3. The display apparatus of claim 1, wherein the controller is configured to extract, as the partial image corresponding to the central area, an area with a highest sum of scores for all pixels within the area among one or more areas having a predetermined size included in the original image.

4. The display apparatus of claim 1, wherein the controller is configured to extract, as the partial image corresponding to the central area, an area including all pixels in which all pixels each has score greater than or equal to a threshold,
   wherein the area is included in the original image, and
   wherein the threshold is determined as a predetermined specific value or a value representing a predetermined higher percentage among scores for all pixels in the original image.

5. The display apparatus of claim 1, wherein the controller is configured to extract, as the partial image corresponding to the central area, an area with a highest sum of adjusted scores for all pixels within the area among one or more areas having a predetermined size included in the original image,
   wherein the adjusted score is determined as a first value based on that the score is greater than or equal to a value representing a predetermined higher percentage, and
   wherein the adjusted score is determined as a second value based on that the score is smaller than the value representing the predetermined higher percentage.

6. The display apparatus of claim 1, wherein the output image is an image of a first size cropped from the central area,
   wherein the output image is configured to be positioned such that a relative position of a first pixel in the original image is identical to a relative position of the first pixel in the output image, and
   wherein the first pixel is a pixel having a highest score among pixels included in the central area or a central pixel of the central area.

7. The display apparatus of claim 1, wherein the output image is an image of a first size cropped from the central area,
   wherein the output image is configured to be positioned such that a relative position of a specific pixel in the original image is identical to a relative position of the specific pixel in the output image, and wherein the specific pixel is a pixel in the original image input through a user interface.

8. The display apparatus of claim 1, wherein the output image is an image of a second size cropped from the original image,
wherein the output image is configured to be positioned such that a relative position of a first pixel in the original image is identical to a relative position of the first pixel in the output image, and
wherein the first pixel is a pixel having a highest score among pixels included in the central area or a central pixel of the central area.

9. The display apparatus of claim 1, wherein the output image is an image of a second size cropped from the original image,
wherein the output image is configured to be positioned such that a relative position of a specific pixel in the original image is identical to a relative position of the specific pixel in the output image, and
wherein the specific pixel is a pixel in the original image input through a user interface.

10. The display apparatus of claim 1, wherein the controller is configured to perform image quality improvement processing on the output image before displaying the output image on the display.

11. The display apparatus of claim 1, wherein the controller is configured to:
control the display to display, a marker on the original image for identifying each a candidate object to be included in the central area and a user interface for updating objects by selecting an object to be added to the central area or an object excluded from the central area; and
process the original image such that the output image includes the central area including the updated objects input through the user interface.

12. The display apparatus of claim 11, wherein based on that the object update is performed in excess of a predetermined number of times or in excess of a predetermined period of time, the controller is configured to:
control the display to display a user interface for configuring the central area; and
process the original image such that the output image includes the configured central area input through the user interface.

13. The display apparatus of claim 12, wherein the controller is configured to extract and store characteristics of the updated objects or characteristics of the configured central area, and
wherein the characteristics are used for an algorithm for configuring central areas in original images.

14. The display apparatus of claim 1, wherein the output image includes a plurality of candidate output images obtained in different ways, and
wherein the controller is configured to control the display to display the plurality of candidate output images and a user interface for selecting one of the plurality of candidate output images.

15. A method of processing and displaying an image, the method performed by a rotatable display apparatus comprising:
a display configured to rotate around a fixed axis and display an image; and
a controller configured to process an original image and control the display to display the original image, wherein the original image is stored in a memory or received through wired or wireless communication,
wherein the method comprises:
obtaining the original image;
obtaining an output image by processing a central area including an object in the original image to be suitable for a rotation state of the display and a resolution of the display; and
controlling the display to display the obtained output image,
wherein the method further comprises:
calculating a score indicating a likelihood of existence of an object for each pixel of the original image,
extracting at least one partial image corresponding to the central area from the original image based on the score; and
obtaining the output image by cropping a portion of the partial or original image based on a position of a specific part of the partial image.

16. The method of claim 15, comprising:
detecting a change in the rotation state of the display; and
controlling the display to display a second output image instead of a first output image which had been displayed on the display, based on the change in the rotation state,
wherein the second output image is obtained by processing an original image of the first output image,
wherein the second output image is pre-stored in the memory or obtained by the controller by processing the original image of the first output image based on the detection of the change in the rotation state, and
wherein an aspect ratio of the second output image is opposite to an aspect ratio of the first output image.

17. The method of claim 15, comprising:
controlling the display to display a marker on the original image for identifying each a candidate object to be included in the central area and a user interface for updating objects by selecting an object to be added to the central area or an object excluded from the central area; and
processing the original image such that the output image includes the central area including the updated objects input through the user interface.

18. The method of claim 17, wherein based on that the object update is performed in excess of a predetermined number of times or in excess of a predetermined period of time, the method comprises:
controlling the display to display a user interface for configuring the central area; and
processing the original image such that the output image includes the configured central area input through the user interface.

19. The method of claim 17, comprising extracting and storing characteristics of the updated objects or characteristics of the configured central area,
wherein the characteristics are used for an algorithm for configuring central areas in original images.

* * * * *